United States Patent
Suzuki et al.

(10) Patent No.: US 9,014,031 B2
(45) Date of Patent: Apr. 21, 2015

(54) WIRELESS COMMUNICATION SYSTEM, APPARATUS AND METHOD USING A POWER HEADROOM VALUE FOR EACH UPLINK COMPONENT CARRIER OF A PLURALITY OF UPLINK COMPONENT CARRIERS

(75) Inventors: Shoichi Suzuki, Osaka (JP); Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/458,177

(22) Filed: Apr. 27, 2012

(65) Prior Publication Data

US 2012/0263060 A1     Oct. 18, 2012

Related U.S. Application Data

(63) Continuation of application No. PCT/JP2010/066326, filed on Sep. 21, 2010.

(30) Foreign Application Priority Data

Oct. 28, 2009   (JP) .................................. 2009-247497

(51) Int. Cl.
  H04L 12/26  (2006.01)
  H04W 52/36  (2009.01)
  H04W 52/32  (2009.01)
  H04W 52/34  (2009.01)

(52) U.S. Cl.
  CPC .......... *H04W 52/365* (2013.01); *H04W 52/325* (2013.01); *H04W 52/34* (2013.01); *Y02B 60/50* (2013.01)

(58) Field of Classification Search
  CPC ... H04W 52/00; H04W 52/34; H04W 52/325; H04W 52/365
  See application file for complete search history.

(56) References Cited

U.S. PATENT DOCUMENTS

| | | |
|---|---|---|
| 2009/0088195 A1 | 4/2009 | Rosa et al. |
| 2009/0175187 A1 | 7/2009 | Jersenius et al. |
| 2010/0118719 A1* | 5/2010 | Ishii et al. ..................... 370/252 |

(Continued)

OTHER PUBLICATIONS

3GPP.TS.36.321, 3rd Generation Partnership Project; Technical Specification Group Radio Access Network; Evolved Universal Terrestrial Radio Access (E-UTRA) Medium Access Control (MAC) Protocol Specification (Release 8), V8.0.0, Dec. 2012, 23 pages.*

(Continued)

*Primary Examiner* — Ayaz Sheikh
*Assistant Examiner* — Mounir Moutaouakil
(74) *Attorney, Agent, or Firm* — Birch, Stewart, Kolasch & Birch, LLP

(57) ABSTRACT

Efficient transmission control of power headroom is performed by a mobile station apparatus that includes a power headroom control unit which manages a power headroom which is a difference between a maximum transmit power value determined for each uplink carrier component by a base station and a predetermined power value estimated for uplink transmission. A path loss measurement unit monitors a path loss of a downlink carrier component informed from the base station among a plurality of downlink carrier components. When a path loss value of any downlink carrier component changes more than a predetermined value, the power headroom control unit modifies transmission to the base station apparatus of the power headroom for uplink transmission corresponding to all the downlink carrier components set by the base station apparatus.

12 Claims, 10 Drawing Sheets

(56) References Cited

U.S. PATENT DOCUMENTS

| | | | |
|---|---|---|---|
| 2010/0232382 A1* | 9/2010 | Gauvreau et al. | 370/329 |
| 2010/0296470 A1* | 11/2010 | Heo et al. | 370/329 |
| 2010/0296471 A1* | 11/2010 | Heo et al. | 370/329 |
| 2010/0297993 A1* | 11/2010 | Heo et al. | 455/423 |
| 2012/0236811 A1* | 9/2012 | Ishii et al. | 370/329 |
| 2012/0281633 A1* | 11/2012 | Kim et al. | 370/328 |

OTHER PUBLICATIONS

3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.5.0 (Mar. 2009).
3rd Generation Partnership Project; Technical Specification Group Radio Access Network; Evolved Universal Terrestrial Radio Access (E-UTRA) Medium Access Control (MAC) protocol specification (Release 8), 3GPP TS 36.321 V8.7.0 (Sep. 2009).
3rd Generation Partnership Project; Technical Specification Group Radio Access Network; Evolved Universal Terrestrial Radio Access (E-UTRA); Physical layer procedures(Release 8), 3GPP TS 36.213 V8.7.0 (May 2009).
3rd Generation Partnership Project; Technical Specification Group Radio Access Network; Further Advancements for E-UTRA Physical Layer Aspects(Release 9), 3GPP TR 36.814 V0.4.1(Feb. 2009).
Ericsson, ST-Ericsson, "Uplink Power Control for Carrier Aggregation", 3GPP TSG RAN WG1 Meeting #58bis R1-094274, Oct. 12-16, 2009.
International Search Report issued in PCT Application No. PCT/JP2010/066326.
Research In Motion, UK Limited, "Uplink Power Control for Carrier Aggregation", 3GPP TSG RAN WG1 Meeting #57b R1-092415, Jun. 29-Jul. 3, 2009.
ZTE, "Considerations on scheduling in carrier aggregation", 3GPP TSG RAN WG2 Meeting #66bis R2-093886, Jun. 29-Jul. 3, 2009.

* cited by examiner

WIRELESS COMMUNICATION SYSTEM, APPARATUS AND METHOD USING A POWER HEADROOM VALUE FOR EACH UPLINK COMPONENT CARRIER OF A PLURALITY OF UPLINK COMPONENT CARRIERS

CROSS REFERENCE TO RELATED APPLICATIONS

This application is a Continuation of PCT International Application No. PCT/JP2010/066326 filed on Sep. 21, 2010, which claims the benefit to Patent Application No. 2009-247497 filed in Japan, on Oct. 28, 2009. The entire contents of all of the above applications is hereby incorporated by reference.

TECHNICAL FIELD

The present invention relates to a technology in which a mobile station apparatus transmits to a base station apparatus a remaining power value (power headroom) which is a difference between maximum transmit power and predetermined power estimated for uplink transmission.

BACKGROUND ART

In an uplink in wireless network evolution (hereinafter referred to as "LTE (Long Term. Evolution)" or "EUTRA (Evolved Universal Terrestrial Radio Access)"), TPC (Transmit Power Control) is performed for the purpose of suppressing power consumption of a mobile station apparatus, or reducing given interference to other cells. Shown is a formula used to decide a transmit power value of a PUSCH (Physical Uplink Shared CHannel) used for uplink data communication specified in Chapter 5 in Non-patent Document 1.

[Formula 1]

$$P_{PUSCH}(i) = \min\{P_{CMAX}, 10\log_{10}(M_{PUSCH}(i)) + P_{O\_PUSCH}(j) + \alpha(j) \cdot PL + \Delta_{TF}(i) + f(i)\} \quad (1)$$
$$= \min\{P_{CMAX}, P_{req}\}$$

In Formula (1), $P_{PUSCH}(i)$ indicates a transmit power value of the PUSCH in an i-th subframe. Min $\{X, Y\}$ is a function for selecting a minimum value of X and Y. $P_{O\_PUSCH}$ is transmit power as the basis for the PUSCH, and is a value specified by a higher layer. $M_{PUSCH}$ indicates the number of PRBs (Physical Resource Block), which is a unit for radio resource assignment used for PUSCH transmission, etc., and indicates that the transmit power becomes larger as the number of PRBs used for PUSCH transmission increases. In addition, PL indicates a path loss, and $\alpha$ is a coefficient multiplied to the path loss and is specified by the higher layer. $\Delta_{TF}$ is an offset value dependent on a modulation scheme etc., and f is an offset value (transmit power control value by a closed loop or an open loop) calculated by a TPC command transmitted by DCI (Downlink Control Information). In addition, $P_{CMAX}$ is a maximum transmit power value, and may be physical maximum transmit power or may be specified by the higher layer. $P_{req}$ is a transmit power value of the PUSCH calculated so as to satisfy a predetermined communication quality.

In addition, in order for a base station apparatus to recognize how much remaining power the mobile station apparatus has with respect to the maximum transmit power value $P_{CMAX}$ when transmitting the PUSCH, the mobile station apparatus informs the base station apparatus of a value obtained by subtracting a predetermined power value estimated for uplink transmission from a maximum transmit power value of a terminal, the value being called a PH (Power Headroom). The PH is defined by Formula (2) in Chapter 5 in Non-patent Document 1.

[Formula 2]

$$PH(i) = P_{CMAX} - P_{req} \quad (2)$$

The PH is rounded off to values of −23 dB to 40 dB per dB, is informed from a physical layer to the higher layer, and is transmitted to the base station apparatus. A positive PH indicates that the mobile station apparatus has remaining transmit power, and a negative PH indicates a state where the terminal is performing transmission with the maximum transmit power although transmit power exceeding the maximum transmit power value is requested to the mobile station apparatus from the base station. The base station apparatus decides a bandwidth allocated for the mobile station apparatus to transmit the PUSCH, a modulation scheme of the PUSCH, etc. according to the PH.

Next, shown is a formula used to decide a transmit power value of a PUCCH (Physical Uplink Control Channel) used for communication of uplink control information specified in Chapter 5 in Non-patent Document 1.

[Formula 3]

$$\begin{aligned} P_{PUCCH}(i) &= \min\{P_{CMAX}, P_{O\_PUCCH}(j) + PL + \\ &\quad h(n_{CQI}, n_{HARQ}) + \Delta_{F\_PUCCH}(F) + g(i)\} \\ &= \min\{P_{CMAX}, P_{req\_PUCCH}\} \end{aligned} \quad (3)$$

In Formula (3), $P_{PUCCH}(i)$ indicates a transmit power value of the PUCCH in an i-th subframe. $P_{O\_PUCCH}$ is a transmit power as the basis for the PUCCH, and is a value specified by the higher layer. h ($n_{CQI}$, $n_{HARQ}$) is a value calculated by the number of bits transmitted by the PUCCH and a format of the PUCCH, $n_{CQI}$ indicates CQI (Channel Quality Information) transmitted by the PUCCH, and $n_{HARQ}$ indicates the number of HARQ bits (ACK/NACK) transmitted by the PUCCH. $\Delta_{F\_PUCCH}$ is an offset value specified from the higher layer for each format of the PUCCH, and g is an offset value (transmit power control value by the closed loop) calculated from the TPC command transmitted by DCI (Downlink Control Information). $P_{req\_PUCCH}$ is a transmit power value of the PUCCH calculated so as to satisfy a predetermined communication quality. Note that the PH with respect to the PUCCH is not transmitted in LTE.

The formats of the PUCCH include: a PUCCH format 1, a PUCCH format 1a, a PUCCH format 1b, a PUCCH format 2, a PUCCH format 2a, and a PUCCH format 2b, the PUCCH format 1 is the format used in transmitting an SR (Scheduling Request) by on-off keying, the PUCCH format 1a is the format used in transmitting 1 bit of HARQ bit by BPSK, and the PUCCH format 1b is the format used in transmitting 2 bits of HARQ bit by QPSK.

The PUCCH format 2 is the format used in transmitting CQI (Channel Quality Information), or used in performing joint coding of CQI (Channel Quality Information) and the HARQ bit and transmitting them when there exists the CQI and the HARQ bit, the PUCCH format 2a is the format used in transmitting the CQI and 1 bit of HARQ bit using DBPSK (Differential Binary Phase Shift Keying) for a UL RS (Uplink Reference Signal) time-multiplexed into the PUCCH format 2a, and the PUCCH format 2b is the format used in transmitting the CQI and 2 bits of HARQ bit using DQPSK (Differential Quadrature Phase Shift Keying) for the UL RS time-multiplexed into the PUCCH format 2b.

Control of transmission of a PH is specified in Chapter 5 in Non-patent Document 2. The mobile station apparatus controls transmission of the PH using two timers (a periodicPHR-Timer and a prohibitPHR-Timer) and one value dl-Pathloss-Change which have been informed from the base station apparatus. The mobile station apparatus decides transmission of the PH in a case applied to at least one of items described hereinafter. Namely, they are the following cases: a case where the prohibitPHR-Timer has expired, and further a path loss has changed more than the dl-PathlossChange [dB] after the PH is transmitted by the uplink radio resource (PUSCH) as initial transmission; a case where the periodicPHR-Timer has expired; and a case where a transmission functionality of the PH is configured or reconfigured by the higher layer, and the setting is not the setting by which transmission of the PH cannot be performed.

When the mobile station apparatus has decided transmission of the PH at a timing when the mobile station apparatus is allocated with the uplink radio resource (PUSCH) used for initial transmission, and further decides to transmit the PH based on a priority of a data signal, it calculates the PH in the physical layer, and transmits the PH. In addition, the mobile station apparatus starts or restarts the periodicPHR-Timer and the prohibitPHR-Timer.

In a wireless access system and a wireless network (hereinafter referred to as "LTE-A (Long Term Evolution-Advanced)" or "A-EUTRA (Advanced Evolved Universal Terrestrial Radio Access)") that achieve higher-speed data communication utilizing a more broadband frequency band than LTE, it is required that LTE-A or A-EUTRA has backward compatibility with LTE, i.e., a base station apparatus of LTE-A simultaneously performs wireless communication with mobile station apparatuses of both LTE-A and LTE, and the mobile station apparatus of LTE-A can perform wireless communication with the base station apparatuses of both LTE-A and LTE, and it has been examined that the same channel structure as in LTE is used for LTE-A. For example, in LTE-A, has been proposed a technology (frequency band aggregation, also referred to as spectrum aggregation, carrier aggregation, frequency aggregation, etc.) in which a plurality of frequency bands (hereinafter referred to as CCs (Carrier Components) or CCs (Component Carriers)) having the same channel structure as in LTE is used as one frequency band (broadband frequency band).

Specifically, in communication using frequency band aggregation, a PBCH, a PDCCH, a PDSCH, a PMCH, a PCFICH, and a PHICH are transmitted for each downlink carrier component, and the PUSCH, the PUCCH, and a PRACH are assigned for each uplink carrier component. Namely, frequency band aggregation is a technology in which the base station apparatus and the plurality of mobile station apparatuses simultaneously transmit and receive plural pieces of data information and plural pieces of control information in an uplink and a downlink using the plurality of carrier components including the PUCCH, the PUSCH, the PDCCH, the PDSCH, etc. (refer to Chapter 5 in Non-patent Document 3).

CITATION LIST

Non-Patent Document 1

Non-Patent Document 1: "3GPP TS36.213 v.8.7.0 (2009-05)"

Non-patent Document 2: "3GPP TS36.321 v.8.5.0 (2009-03)"

Non-patent Document 3: "3GPP TR36.814 v.0.4.1 (2009-02)"

DISCLOSURE OF THE INVENTION

Problems to be Solved by the Invention

However, since the base station apparatus and the mobile station apparatus have performed wireless communication in a set of uplink carrier component and downlink carrier component in a conventional technology, it is not disclosed how transmission of a PH is controlled when the base station apparatus allocates the plurality of uplink carrier components and downlink carrier components to the mobile station apparatus. In addition, an efficient control method of transmission of the PH differs depending on a frequency band to which carrier components to be subjected to frequency band aggregation belong, or configurations of a transmission antenna and a PA (Power Amplifier) of the mobile station apparatus (for example, signals of all the uplink carrier components are transmitted through one transmission antenna, or signals are transmitted using a different transmission antenna for each group of the uplink carrier components, etc.).

In addition, there has been a problem that if no PRB for PUSCH transmission is assigned at a timing of transmitting a PH when the mobile station apparatus tries to transmit the PH of a certain uplink carrier component in a different uplink carrier component, the PH cannot be calculated from Formula (1).

The present invention is made in view of the above-described problems, and an object of the present invention is to provide a wireless communication system, a base station apparatus, a mobile station apparatus, a wireless communication method, a control program for the mobile station apparatus, and an integrated circuit for the base station apparatus and the mobile station apparatus in which an efficient control of transmission of the PH can be performed according to a frequency band to which carrier components to be subjected to frequency band aggregation belong, or configurations of a transmission antenna and a PA of the mobile station apparatus.

Means for Solving the Problems (1) In order to achieve the above-described object, the present invention has taken the following measures. Namely, a wireless communication system of the present invention is the wireless communication system in which a mobile station apparatus transmits a power headroom for each uplink component carrier to a base station apparatus, wherein the base station apparatus informs the mobile station apparatus of a plurality of uplink component carriers on which the mobile station apparatus triggers report of the power headrooms, and wherein the mobile station apparatus triggers the report of the power headrooms in the plurality of uplink component carriers when a predetermined condition is satisfied.

(2) In addition, in the wireless communication system of the present invention, the mobile station apparatus, when having triggered transmission of the power headrooms, and when an uplink radio resource for initial transmission is assigned, calculates the triggered power headrooms of the plurality of uplink component carriers, and transmits the calculated power headrooms of the plurality of uplink component carriers by the assigned uplink radio resource for initial transmission.

(3) In addition, in the wireless communication system of the present invention, the base station apparatus sets to the mobile station apparatus a plurality of downlink component carriers used for wireless communication with the mobile station apparatus, and the predetermined condition is that a path loss value for at least one of the plurality of downlink component carriers set by the base station apparatus changes more than a predetermined value.

(4) In addition, in the wireless communication system of the present invention, the base station apparatus sets to the mobile station apparatus a plurality of downlink component carriers used for wireless communication with the mobile station apparatus and sets to the mobile station apparatus one specific downlink component carrier of the plurality of downlink component carriers used for wireless communication, and the predetermined condition is that a path loss value for the one specific downlink component carrier set by the base station apparatus changes more than a predetermined value.

(5) In addition, in the wireless communication system of the present invention, the base station apparatus sets one first timer (prohibitPHR-Timer) to the mobile station apparatus, and the predetermined condition is further that the only one first timer (prohibitPHR-Timer) set by the base station apparatus has expired.

(6) In addition, in the wireless communication system of the present invention, the base station apparatus sets one second timer (periodicPHR-Timer) to the mobile station apparatus, and the predetermined condition is that the only one second timer (periodicPHR-Timer) set by the base station apparatus expires.

(7) In addition, in the wireless communication system of the present invention, the mobile station apparatus makes the first timer (prohibitPHR-Timer) and the second timer (periodicPHR-Timer) start or restart when having transmitted the power headrooms of the plurality of uplink component carriers.

(8) In addition, in the wireless communication system of the present invention, the predetermined condition is that configuration or reconfiguration has been performed regarding a reporting functionality of the power headroom.

(9) In addition, in the wireless communication system of the present invention, configuration or reconfiguration of the reporting functionality of the power headroom is not used to disable the reporting functionality.

(10) In addition, a wireless communication system of the present invention is the wireless communication system in which a mobile station apparatus transmits a power headroom for each uplink component carrier to a base station apparatus, and the mobile station apparatus calculates a power headroom of a first uplink component carrier using a predetermined resource amount of a PUSCH when transmitting the power headroom of the first uplink component carrier by a second uplink component carrier, and the base station apparatus determines that the power headroom of the first uplink component carrier has been calculated by the mobile station apparatus using the predetermined resource amount of the PUSCH.

(11) In addition, in the wireless communication system of the present invention, when a resource of the PUSCH is assigned to the first uplink component carrier by the base station apparatus when the mobile station apparatus transmits the power headroom, the mobile station apparatus calculates the power headroom of the first uplink component carrier using the resource amount of the PUSCH allocated to the first uplink component carrier, and the base station apparatus determines that the power headroom of the first uplink component carrier has been calculated by the mobile station apparatus using the resource amount of the PUSCH assigned to the first uplink component carrier.

(12) In addition, in the wireless communication system of the present invention, the predetermined resource amount of the PUSCH is a resource amount of the PUSCH assigned by the base station apparatus to the second uplink component carrier which transmits the power headroom.

(13) In addition, in the wireless communication system of the present invention, the predetermined resource amount of the PUSCH is one physical resource block, and the physical resource block is a unit to allocate the PUSCH to the mobile station apparatus.

(14) In addition, a wireless communication system of the present invention is the wireless communication system in which a mobile station apparatus transmits a power headroom for each uplink component carrier to a base station apparatus, the mobile station apparatus calculates the power headroom of the uplink component carrier using a predetermined PUCCH format, and the base station apparatus determines that the power headroom has been calculated by the mobile station apparatus using the predetermined PUCCH format.

(15) In addition, in the wireless communication system of the present invention, when transmitting a PUCCH in the uplink component carrier on which the power headroom is calculated when the mobile station apparatus transmits the power headroom, the mobile station apparatus calculates the power headroom of the uplink component carrier which transmits the PUCCH using the PUCCH format of the PUCCH to be transmitted, and the base station apparatus determines that the power headroom of the uplink component carrier which transmits the PUCCH has been calculated by the mobile station apparatus using the PUCCH format of the PUCCH to be transmitted in the uplink component carrier.

(16) In addition, a wireless communication system of the present invention is the wireless communication system in which a mobile station apparatus transmits a power headroom for each uplink component carrier to a base station apparatus, the mobile station apparatus calculates the power headroom of the uplink component carrier using an offset value with respect to a predetermined PUCCH format, and the base station apparatus determines that the power headroom has been calculated by the mobile station apparatus using the offset value with respect to the predetermined PUCCH format.

(17) In addition, in the wireless communication system of the present invention, when transmitting the PUCCH in the uplink component carrier on which the power headroom is calculated when the mobile station apparatus transmits the power headroom, the mobile station apparatus calculates the power headroom of the uplink component carrier which transmits the PUCCH using the offset value with respect to the PUCCH format of the PUCCH to be transmitted, and the base station apparatus determines that the power headroom of the uplink component carrier which transmits the PUCCH has been calculated by the mobile station apparatus using the offset value with respect to the PUCCH format of the PUCCH to be transmitted in the uplink component carrier.

(18) In addition, in the wireless communication system of the present invention, the offset value is specified by the base station apparatus for each PUCCH format.

(19) In addition, in the wireless communication system of the present invention, the offset value is calculated from the number of bits of UCI transmitted by the PUCCH.

(20) In addition, in the wireless communication system of the present invention, the offset value with respect to the predetermined PUCCH format is the offset value with respect to a PUCCH format 1a used to transmit 1 bit of HARQ bit.

(21) In addition, a base station apparatus of the present invention is the base station apparatus which receives a power headroom for each uplink component carrier transmitted by a mobile station apparatus, and the base station apparatus informs the mobile station apparatus of a plurality of uplink component carriers on which the mobile station apparatus triggers report of the power headrooms.

(22) In addition, a base station apparatus of the present invention is the base station apparatus which receives a power headroom for each uplink component carrier transmitted by a mobile station apparatus, and when having received a power headroom of a first uplink component carrier by a second uplink component carrier, the base station apparatus determines that the power headroom of the first uplink component carrier has been calculated by the mobile station apparatus using a predetermined resource amount of a PUSCH.

(23) In addition, a base station apparatus of the present invention is the base station apparatus which receives a power headroom for each uplink component carrier transmitted by a mobile station apparatus, and the base station apparatus determines that the received power headroom has been calculated by the mobile station apparatus using a predetermined PUCCH format.

(24) In addition, a base station apparatus of the present invention is the base station apparatus which receives a power headroom for each uplink component carrier transmitted by a mobile station apparatus, and the base station apparatus determines that the received power headroom has been calculated by the mobile station apparatus using an offset value with respect to a predetermined PUCCH format.

(25) In addition, a mobile station apparatus of the present invention is the mobile station apparatus which transmits a power headroom for each uplink component carrier to a base station apparatus, and when a predetermined condition is satisfied, the mobile station apparatus triggers report of the power headrooms in the plurality of uplink component carriers.

(26) In addition, a mobile station apparatus of the present invention is the mobile station apparatus which transmits a power headroom for each uplink component carrier to a base station apparatus, and when transmitting a power headroom of a first uplink component carrier by a second uplink component carrier, the mobile station apparatus calculates the power headroom of the first uplink component carrier using a predetermined resource amount of a PUSCH.

(27) In addition, a mobile station apparatus of the present invention is the mobile station apparatus which transmits a power headroom for each uplink component carrier to abase station apparatus, and the mobile station apparatus calculates the power headroom of the uplink component carrier using a predetermined PUCCH format.

(28) In addition, a mobile station apparatus of the present invention is the mobile station apparatus which transmits a power headroom for each uplink component carrier to a base station apparatus, and the mobile station apparatus calculates the power headroom of the uplink component carrier using an offset value with respect to a predetermined PUCCH format.

(29) In addition, a wireless communication method of the present invention is the wireless communication method used for a base station apparatus which receives a power headroom for each uplink component carrier transmitted by a mobile station apparatus, and the base station apparatus informs the mobile station apparatus of the plurality of uplink component carriers on which the mobile station apparatus triggers report of the power headrooms.

(30) In addition, a wireless communication method of the present invention is the wireless communication method used for a base station apparatus which receives a power headroom for each uplink component carrier transmitted by a mobile station apparatus, and when having received a power headroom of a first uplink component carrier by a second uplink component carrier, the base station apparatus determines that the power headroom of the first uplink component carrier has been calculated by the mobile station apparatus using a predetermined resource amount of a PUSCH.

(31) In addition, a wireless communication method of the present invention is the wireless communication method used for a base station apparatus which receives a power headroom for each uplink component carrier transmitted by a mobile station apparatus, and the base station apparatus determines that the received power headroom has been calculated by the mobile station apparatus using a predetermined PUCCH format.

(32) In addition, a wireless communication method of the present invention is the wireless communication method used for a base station apparatus which receives a power headroom for each uplink component carrier transmitted by a mobile station apparatus, and the base station apparatus determines that the received power headroom has been calculated by the mobile station apparatus using an offset value with respect to a predetermined PUCCH format.

(33) In addition, a wireless communication method of the present invention is the wireless communication method used for a mobile station apparatus which transmits a power headroom for each uplink component carrier to a base station apparatus, and when a predetermined condition is satisfied, the mobile station apparatus triggers report of the power headrooms in the plurality of uplink component carriers.

(34) In addition, a wireless communication method of the present invention is the wireless communication method used for a mobile station apparatus which transmits a power headroom for each uplink component carrier to a base station apparatus, and when transmitting a power headroom of a first uplink component carrier by a second uplink component carrier, the mobile station apparatus calculates the power headroom of the first uplink component carrier using a predetermined resource amount of a PUSCH.

(35) In addition, a wireless communication method of the present invention is the wireless communication method used for a mobile station apparatus which transmits a power headroom for each uplink component carrier to a base station apparatus, and the mobile station apparatus calculates the power headroom of the uplink component carrier using a predetermined PUCCH format.

(36) In addition, a wireless communication method of the present invention is the wireless communication method used for a mobile station apparatus which transmits a power headroom for each uplink component carrier to a base station apparatus, and the mobile station apparatus calculates the power headroom of the uplink component carrier using an offset value with respect to a predetermined PUCCH format.

(37) In addition, a control program for a mobile station apparatus of the present invention is the control program used for the mobile station apparatus which transmits a power headroom for each uplink component carrier to a base station apparatus, and when a predetermined condition is satisfied, processing for triggering report of the power headrooms in the plurality of uplink component carriers has been converted into a computer-readable and computer-executable command.

(38) In addition, a control program for a mobile station apparatus of the present invention is the control program used for the mobile station apparatus which transmits a power headroom for each uplink component carrier to a base station apparatus, and when the mobile station apparatus transmits a power headroom of a first uplink component carrier by a second uplink component carrier, processing for calculating the power headroom of the first uplink component carrier using a predetermined resource amount of a PUSCH has been converted into a computer-readable and computer-executable command.

(39) In addition, a control program for a mobile station apparatus of the present invention is the control program used for the mobile station apparatus which transmits a power headroom for each uplink component carrier to a base station apparatus, and processing for calculating the power headroom of the uplink component carrier using a predetermined PUCCH format has been converted into a computer-readable and computer-executable command.

(40) In addition, a control program for a mobile station apparatus of the present invention is the control program used for the mobile station apparatus which transmits a power headroom for each uplink component carrier to a base station apparatus, and processing for calculating the power headroom of the uplink component carrier using an offset value with respect to a predetermined PUCCH format has been converted into a computer-readable and computer-executable command.

(41) In addition, an integrated circuit for a base station apparatus of the present invention is the integrated circuit used for the base station apparatus which receives a power headroom for each uplink component carrier transmitted by a mobile station apparatus, and the integrated circuit has a step of informing the mobile station apparatus of the plurality of uplink component carriers on which the mobile station apparatus triggers report of the power headrooms.

(42) In addition, an integrated circuit for a base station apparatus of the present invention is the integrated circuit used for the base station apparatus which receives a power headroom for each uplink component carrier transmitted by a mobile station apparatus, and when the base station apparatus receives the power headroom of a first uplink component carrier by a second uplink component carrier, the integrated circuit has a step of determining that the power headroom of the first uplink component carrier has been calculated by the mobile station apparatus using a predetermined resource amount of a PUSCH.

(43) In addition, an integrated circuit for a base station apparatus of the present invention is the integrated circuit used for the base station apparatus which receives a power headroom for each uplink component carrier transmitted by a mobile station apparatus, and the base station apparatus determines that the received power headroom has been calculated by the mobile station apparatus using a predetermined PUCCH format.

(44) In addition, an integrated circuit for a base station apparatus of the present invention is the integrated circuit used for the base station apparatus which receives a power headroom for each uplink component carrier transmitted by a mobile station apparatus, and the integrated circuit has a step of determining that the received power headroom has been calculated by the mobile station apparatus using an offset value with respect to a predetermined PUCCH format.

(45) In addition, an integrated circuit for a mobile station apparatus of the present invention is the integrated circuit used for the mobile station apparatus which transmits a power headroom for each uplink component carrier to a base station apparatus, and the integrated circuit has a step of triggering report of the power headrooms in the plurality of uplink component carriers when a predetermined condition is satisfied.

(46) In addition, an integrated circuit for a mobile station apparatus of the present invention is the integrated circuit used for the mobile station apparatus which transmits a power headroom for each uplink component carrier to a base station apparatus, and when the mobile station apparatus transmits the power headroom of a first uplink component carrier by a second uplink component carrier, the integrated circuit has a step of calculating the power headroom of the first uplink component carrier using a predetermined resource amount of a PUSCH.

(47) In addition, an integrated circuit for a mobile station apparatus of the present invention is the integrated circuit used for the mobile station apparatus which transmits a power headroom for each uplink component carrier to a base station apparatus, and the integrated circuit has a step of calculating the power headroom of the uplink component carrier using a predetermined PUCCH format.

(48) In addition, an integrated circuit for a mobile station apparatus of the present invention is the integrated circuit used for the mobile station apparatus which transmits a power headroom for each uplink component carrier to a base station apparatus, and the integrated circuit has a step of calculating the power headroom of the uplink component carrier using an offset value with respect to a predetermined PUCCH format.

Advantage of the Invention

According to the present invention, a mobile station apparatus can perform an efficient control of transmission of a power headroom according to a frequency band to which carrier components to be subjected to frequency band aggregation belong, or configurations of a transmission antenna and a power amplifier of the mobile station apparatus.

BEST MODES FOR CARRYING OUT THE INVENTION

Recently, a wireless access system and a wireless network that achieve higher-speed data communication (LTE-A) have been examined in 3GPP (3rd Generation Partnership Project) utilizing evolution of a wireless access system and a wireless network of cellular mobile communication (LTE) and a more broadband frequency band than LTE. In LTE, an OFDM (Orthogonal Frequency Division Multiplexing) system, which is multicarrier transmission, is used as a communication system for wireless communication from a base station apparatus to a mobile station apparatus (downlink). In addition, an SC-FDMA (Single-Carrier Frequency Division Multiple Access) system, which is single career transmission, is used as a communication system for wireless communication from the mobile station apparatus to the base station apparatus (uplink).

In addition, in the LTE, in the downlink, assigned are an SCH (Synchronization CHannel), a PBCH (Physical Broadcast CHannel), a PDCCH (Physical Downlink Control CHannel), a PDSCH (Physical Downlink Shared CHannel), a PMCH (Physical Multicast CHannel), a PCFICH (Physical Control Format Indicator CHannel), and a PHICH (Physical Hybrid automatic repeat request Indicator CHannel). In addition, in the uplink, assigned are a PUSCH, a PUCCH (Physical Uplink Control CHannel), and a PRACH (Physical Random Access CHannel).

First Embodiment

Hereinafter, a first embodiment of the present invention will be described in detail with reference to drawings.

<Regarding Wireless Communication System>

Figure 6:
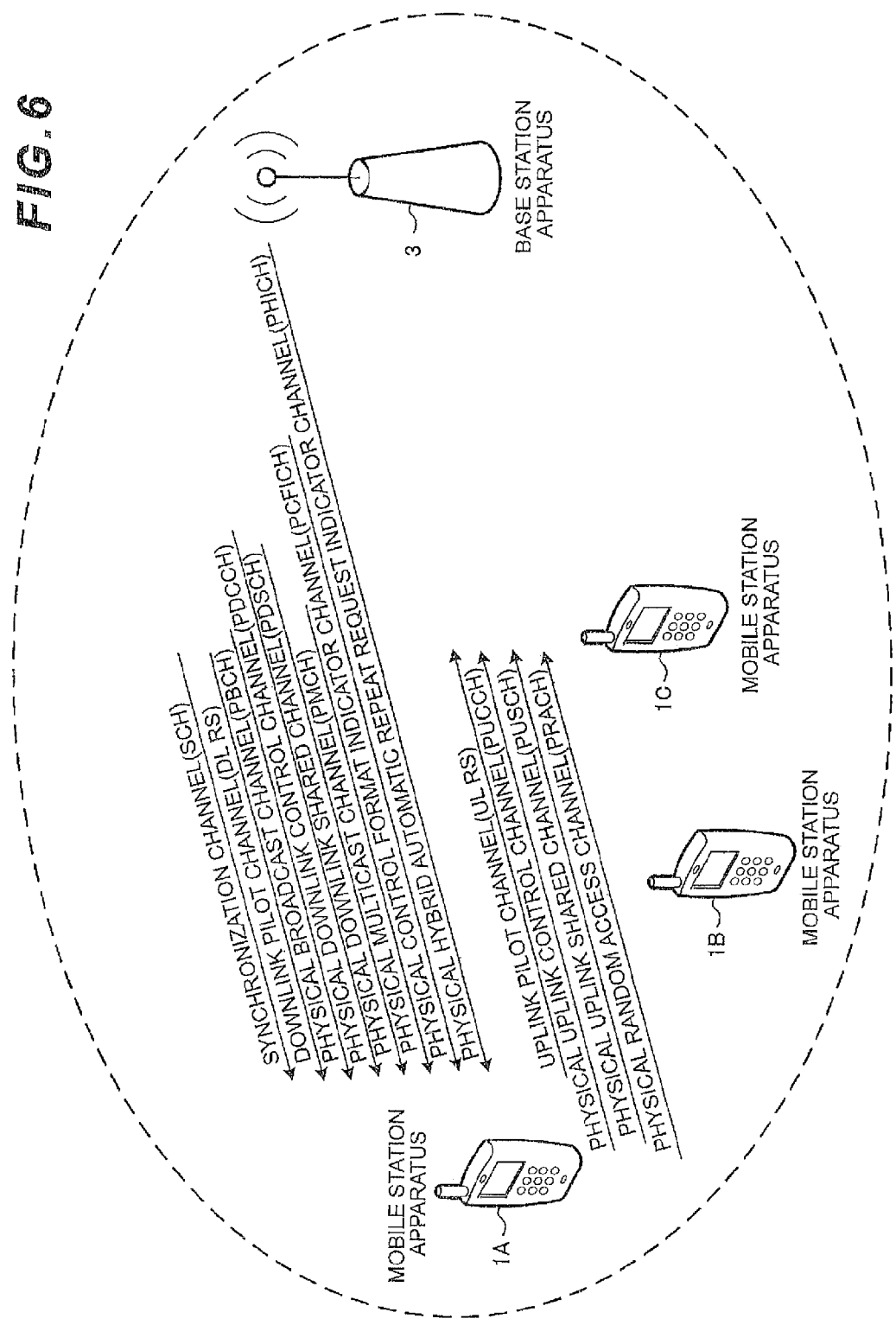
FIG. 6 is a conceptual illustration of a wireless communication system of the present invention.

FIG. 6 is a conceptual illustration of a wireless communication system of the present invention. In FIG. 6, the wireless communication system comprises mobile station apparatuses 1A to 1C and a base station apparatus 3. The mobile station apparatuses 1A to 1C and the base station apparatus 3 perform communication using frequency band aggregation, which will be described hereinafter. FIG. 6 shows that in wireless communication from the base station apparatus 3 to the mobile station apparatuses 1A to 1C (downlink), assigned are an SCH (Synchronization CHannel), a downlink pilot channel (alternatively, also referred to as a "DL RS (Downlink Reference Signal)"), a PBCH (Physical Broadcast CHannel), a PDCCH (Physical Downlink Control CHannel), a PDSCH (Physical Downlink Shared CHannel), a PMCH (Physical Multicast CHannel), a PCFICH (Physical Control Format Indicator CHannel), and a PHICH (Physical Hybrid ARQ Indicator CHannel).

In addition, FIG. 6 shows that in wireless communication from the mobile station apparatuses 1A to 1C to the base station apparatus 3 (uplink), assigned are an uplink pilot channel (alternatively, also referred to as an "UL RS (Uplink Reference Signal)"), a PUCCH (Physical Uplink Control CHannel), a PUSCH (Physical Uplink Shared CHannel), a PRACH (Physical Random Access CHannel). Hereinafter, the mobile station apparatuses 1A to 1C are referred to as a mobile station apparatus 1.

<Regarding Frequency Band Aggregation>

Figure 7:
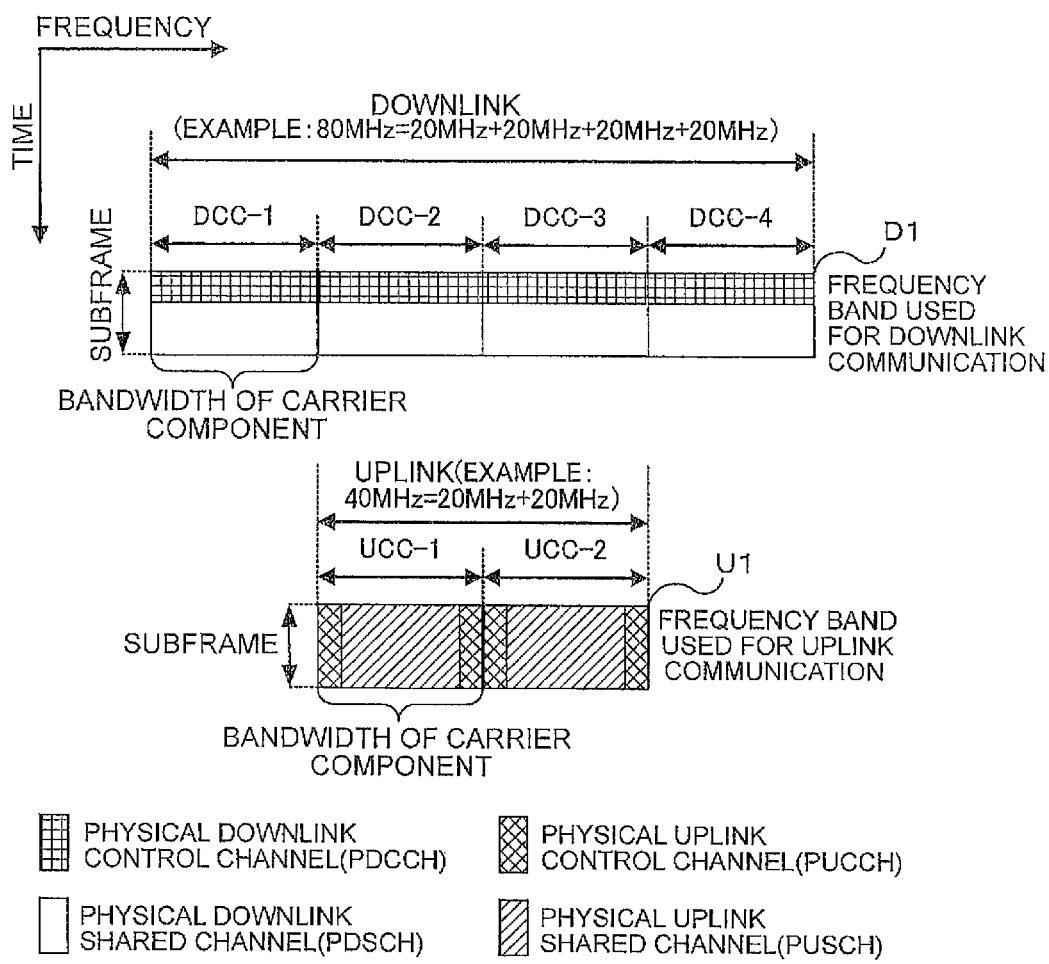
FIG. 7 is a diagram showing one example of frequency band aggregation processing of the present invention.

FIG. 7 is a diagram showing one example of frequency band aggregation processing of the present invention. In FIG. 7, a horizontal axis indicates a frequency domain and a vertical axis indicates a time domain. As shown in FIG. 7, a downlink subframe D1 is comprised of subframes of four carrier components (a DCC-1 (Downlink Component Carrier-1), a DCC-2, a DCC-3, and a DDC-4) each having a bandwidth of 20 MHz. To each of the subframes of the downlink carrier components, time-multiplexed are a region in which the PDCCH is allocated indicated by a region hatched with lattice-shaped lines, and a region in which the PDSCH is allocated indicated by a region without hatching. For example, the base station apparatus 3 allocates a signal in the PDSCHs of one or more downlink carrier components of the four downlink carrier components in a certain downlink subframe, and transmits it to the mobile station apparatus 1.

Meanwhile, an uplink subframe U1 is comprised of two carrier components (a UCC-1 (Uplink Component Carrier-1), and a UCC-2) with a bandwidth of 20 MHz. To each of the subframes of the uplink carrier components, frequency-multiplexed are a region in which the PUCCH is allocated indicated by a region hatched with oblique lattice-shaped lines, and a region in which the PUSCH is allocated indicated by a region hatched with rising oblique lines from bottom left to top right. For example, the mobile station apparatus 1 allocates a signal in the PUSCH of one or more uplink carrier components of the two uplink carrier components in a certain uplink subframe, and transmits it to the base station apparatus 3.

Figure 8:
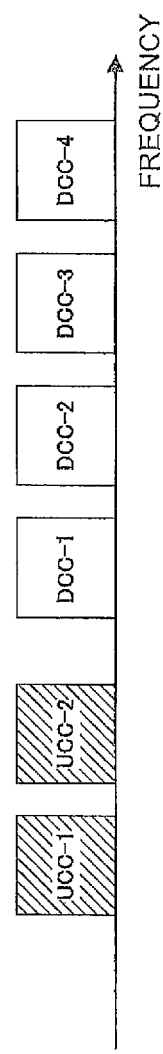
FIG. 8 is a diagram showing one example of a configuration of carrier components of the present invention.

FIG. 8 is a diagram showing one example of a configuration of carrier components of the present invention. In FIG. 8, a horizontal axis indicates a frequency domain, and the DCC-1 and the DCC-2, the DCC-3 and the DCC-4, and the UCC-1 and the UCC-2 are comprised of contiguous frequency bands in the frequency domain. When the downlink carrier components are comprised of the contiguous frequency bands as shown in FIG. 8, a path loss measured in each downlink carrier component tends to be a value approximate to each other. In addition, the mobile station apparatus 1 can transmit and receive signals of the plurality of downlink carrier components and the plurality of uplink carrier components comprised of the contiguous frequency bands using one antenna.

<Regarding Downlink Radio Frame>

Figure 9:
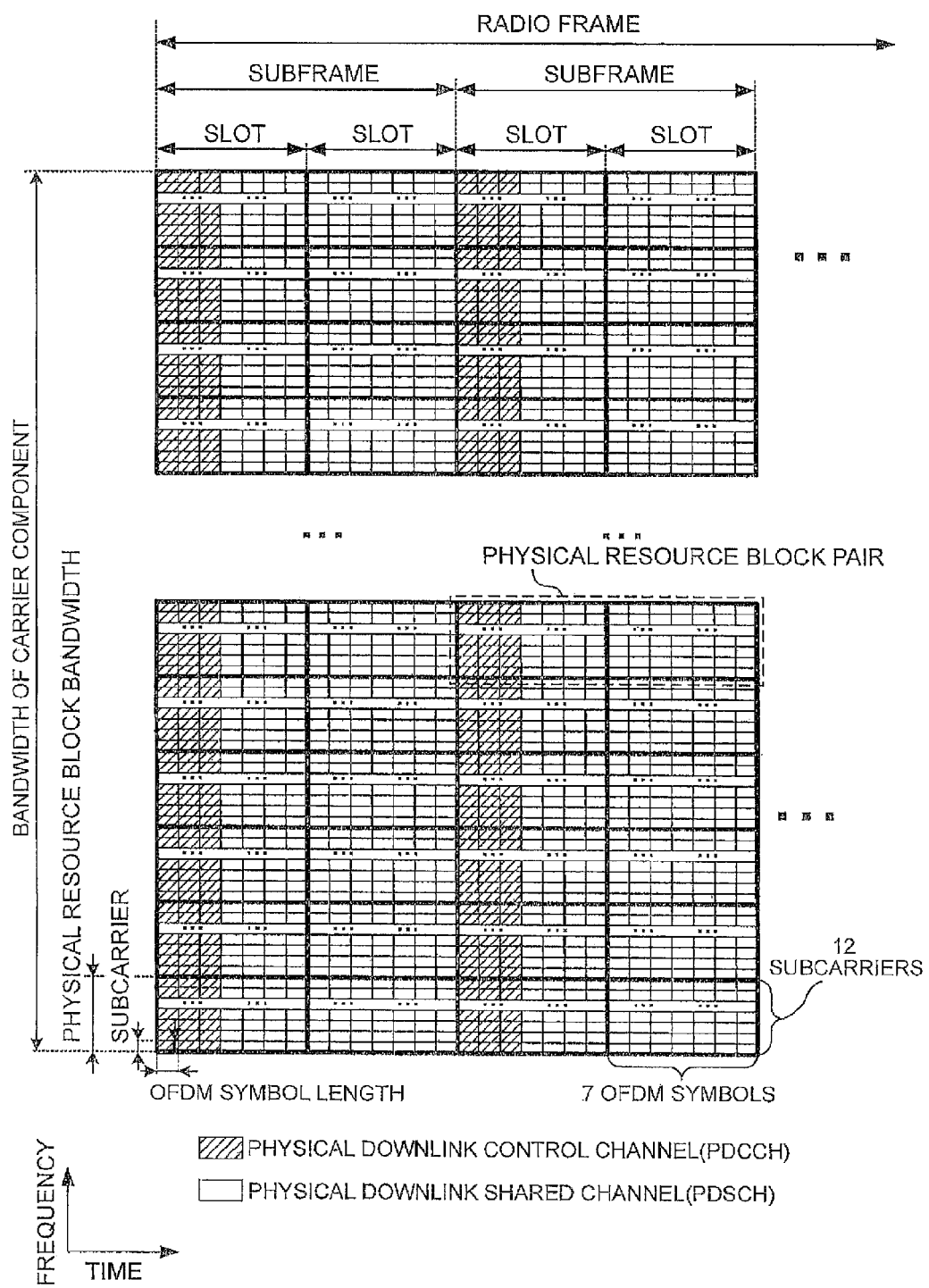
FIG. 9 is a schematic illustration showing one example of a configuration of a downlink radio frame of the present invention.

FIG. 9 is a schematic illustration showing one example of a configuration of a downlink radio frame of the present invention. FIG. 9 shows the configuration of the radio frame in a certain downlink carrier component. In FIG. 9, a horizontal axis indicates a time domain and a vertical axis indicates a frequency domain. As shown in FIG. 9, the radio frame of the downlink carrier component is comprised of a plurality of downlink PRB (Physical Resource Block) pairs (for example, a region surrounded with a dashed line in FIG. 9). This downlink PRB pair is a unit of radio resource allocation, etc., and is comprised of a frequency band (PRB bandwidth; 180 kHz) with a predetermined width and a time zone (two slots are equal to one subframe; 1 ms).

One downlink PRB pair is comprised of two downlink PRBs (PRB bandwidth by a slot) contiguous in the time domain. One downlink PRB (a unit surrounded with a thick line in FIG. 9) is comprised of twelve subcarriers (15 kHz) in the frequency domain and comprised of seven OFDM symbols (71 µs) in the time domain.

In the time domain, there are included a slot (0.5 ms) comprised of seven OFDM (Orthogonal Frequency Division Multiplexing) symbols (71 µs), a subframe (1 ms) comprised of two slots, and a radio frame (10 ms) comprised of ten subframes. In the frequency domain, the plurality of downlink PRBs is allocated according to a bandwidth of the downlink carrier component. Note that a unit comprised of one subcarrier and one OFDM symbol is referred to as a downlink resource element.

Hereinafter, a channel assigned in the downlink radio frame will be described. In each downlink subframe, for example, the PDCCH, the PDSCH, and the DL RS are assigned. First, the PDCCH will be described. The PDCCH is allocated from an OFDM symbol of a head of a subframe (region hatched with the rising oblique lines from bottom left to top right). Note that the number of OFDM symbols in which the PDCCH is allocated differs for each subframe. In the PDCCH, allocated is a signal of DCI (Downlink Control Information) which is comprised of information formats, such as downlink assignment (also referred to as DL grant) and uplink grant, and which is information used for communication control.

Note that the downlink assignment is comprised of information indicating a modulation scheme with respect to the PDSCH, information indicating a coding scheme, information indicating radio resource allocation, information regarding a HARQ (Hybrid Automatic Repeat Request), a TPC command, etc. In addition, the uplink grant is comprised of information indicating a modulation scheme with respect to the PUSCH, information indicating the coding scheme, information indicating radio resource allocation, information regarding the HARQ, the TPC command, etc. Note that the HARQ is a technology in which for example, when the mobile station apparatus 1 (base station apparatus 3) transmits success/failure (ACK/NACK) of decoding of data information to the base station apparatus 3 (mobile station apparatus 1), and the mobile station apparatus 1 (base station apparatus 3) cannot decode the data information due to an error (NACK), the base station apparatus 3 (mobile station apparatus 1) retransmits the signal, and the mobile station apparatus 1 (base station apparatus 3) performs decoding processing with respect to a composite signal of the signal received again and the already received signal.

Next, the PDSCH will be described. The PDSCH is allocated in an OFDM symbol (region without hatching) other than the OFDM symbol in which the PDCCH of the subframe is allocated. A signal (referred to as a data signal) of data information (Transport Block) is allocated in the PDSCH. A radio resource of the PDSCH is assigned using downlink assignment, and is allocated in the same downlink subframe as the PDCCH including the downlink assignment. Although an illustration of the DL RS is omitted in FIG. 9 for simplifying a description, the DL RS is decentrally allocated in the frequency domain and the time domain.

<Regarding Uplink Radio Frame>

Figure 10:
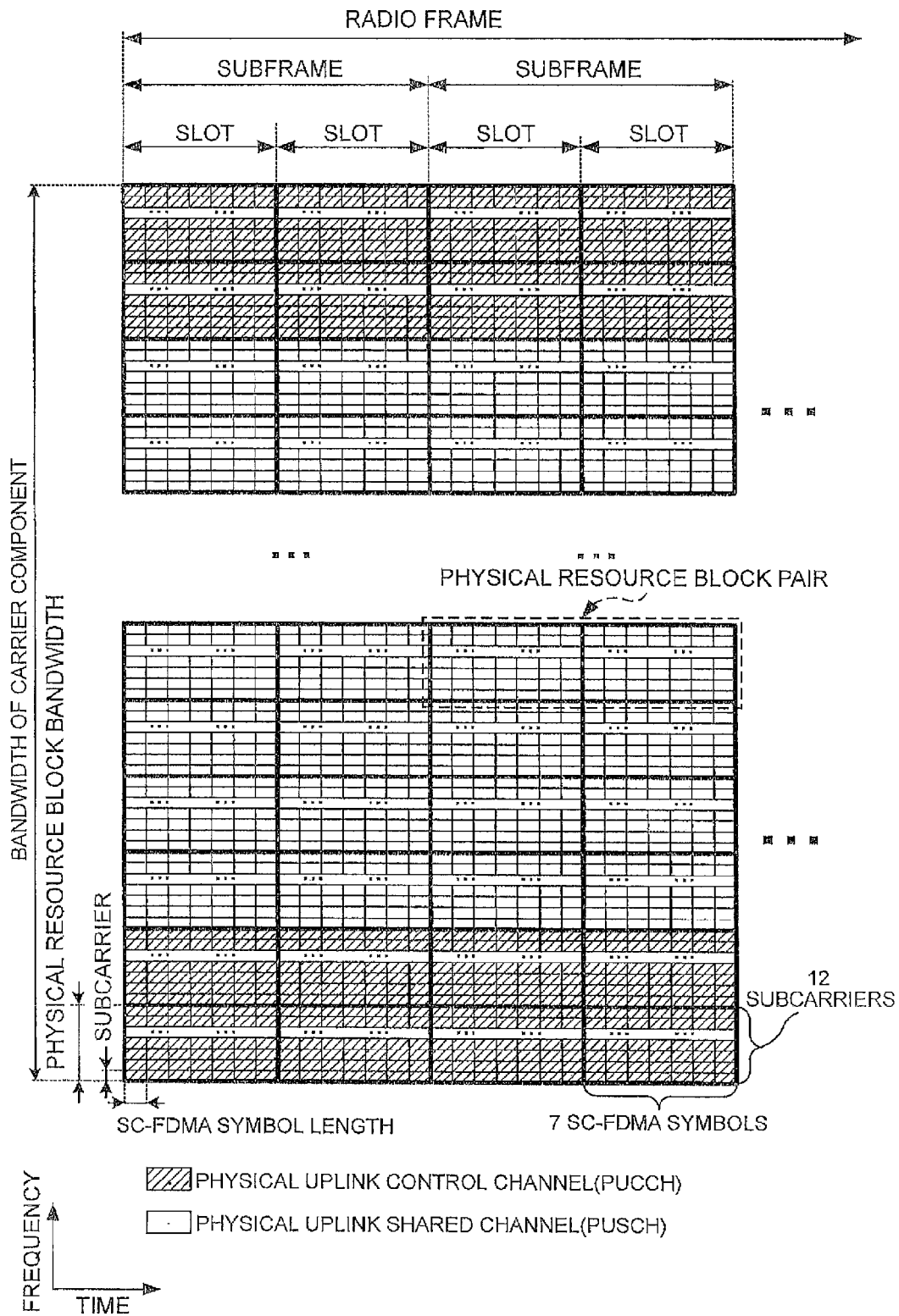
FIG. 10 is a schematic illustration showing one example of a configuration of an uplink radio frame of the present invention.

FIG. 10 is a schematic illustration showing one example of a configuration of an uplink radio frame of the present invention. FIG. 10 shows a configuration of the radio frame in a certain uplink carrier component. In FIG. 10, a horizontal axis indicates a time domain and a vertical axis indicates a frequency domain. As shown in FIG. 10, the radio frame of the uplink carrier component is comprised of a plurality of uplink PRB pairs (for example, a region surrounded with a dashed line in FIG. 10). This uplink PRB pair is a unit of radio resource allocation, etc., and is comprised of a frequency band (PRB bandwidth; 180 kHz) with a predetermined width and a time zone (two slots are equal to one subframe; 1 ms).

One uplink PRB pair is comprised of continuous two uplink PRBs (PRB bandwidth by slot) in the time domain. One uplink PRB (a unit surrounded with a thick line in FIG. 10) is comprised of twelve subcarriers (15 kHz) in the frequency domain and comprised of seven SC-FDMA symbols (71 µs) in the time domain. In the time domain, there are included a slot (0.5 ms) comprised of seven SC-FDMA (Single-Carrier Frequency Division Multiple Access) symbols (71 µs), a subframe (1 ms) comprised of two slots, and a radio frame (10 ms) comprised of ten subframes. In the frequency domain, the plurality of uplink PRBs is allocated according to a bandwidth of the uplink carrier component. Note that a unit comprised of one subcarrier and one SC-FDMA symbol is referred to as an uplink resource element.

Hereinafter, a channel assigned in the uplink radio frame will be described. In each uplink subframe, for example, the PUCCH, the PUSCH, and the UL RS are assigned. First, the PUCCH will be described. The PUCCH is assigned to an uplink PRB pair (region hatched with the rising oblique lines from bottom left to top right) of both ends of a bandwidth of the uplink carrier component. In the PUCCH, allocated is a signal of UCI (Uplink Control Information) which is the information used for controlling communication, such as channel quality information indicating a downlink channel quality, an SR (Scheduling Request) indicating a request for uplink radio resource allocation, and ACK/NACK with respect to the PDSCH.

Next, the PUSCH will be described. The PUSCH is assigned to an uplink PRB pair (region without hatching) other than the uplink PRB in which the PUCCH is allocated. In the PUSCH, allocated is a signal of the UCI and data information (Transport Block), which is the information other than the UCI. A radio resource of the PUSCH is assigned using uplink grant, and is allocated in an uplink subframe of a subframe after a predetermined time has passed since the subframe received the PDCCH including the uplink grant. Although the UL RS is time-multiplexed with the PUCCH and the PUSCH, a detailed description thereof is omitted for simplifying the description.

<Regarding Configuration of Base Station Apparatus 3>

Figure 1:
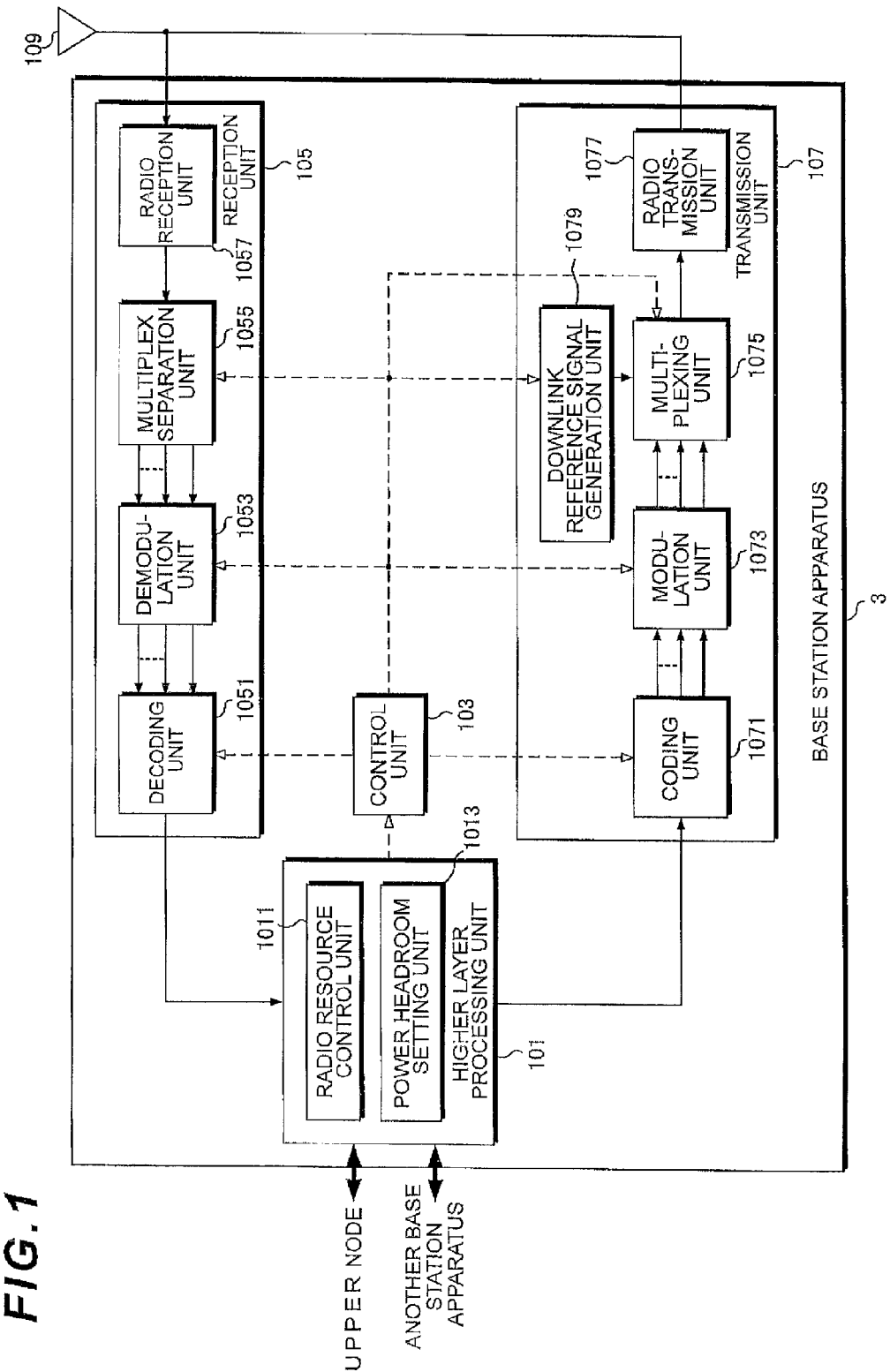
FIG. 1 is a schematic block diagram showing a configuration of a base station apparatus 3 of the present invention.

FIG. 1 is a schematic block diagram showing a configuration of the base station apparatus 3 of the present invention. As shown in the drawing, the base station apparatus 3 is configured to include a higher layer processing unit 101, a control unit 103, a reception unit 105, a transmission unit 107, and a transmission/reception antenna 109. In addition, the higher layer processing unit 101 is configured to include a radio resource control unit 1011 and a power headroom setting unit 1013. In addition, the reception unit 105 is configured to include a decoding unit 1051, a demodulation unit 1053, a multiplex separation unit 1055, and a radio reception unit 1057. In addition, the transmission unit 107 is configured to include a coding unit 1071, a modulation unit 1073, a multiplexing unit 1075, a radio transmission unit 1077, and a DL RS generation unit 1079. Note that in FIG. 1, the base station apparatus 3 performs transmission of a plurality of downlink carrier components and reception of a plurality of uplink carrier component through the one transmission/reception antenna 109.

The higher layer processing unit 101 outputs data information for each downlink carrier component to the transmission unit 107. In addition, the higher layer processing unit 101 performs processing of a PDCP (Packet Data Convergence Protocol) layer, an RLC (Radio Link Control) layer, and an RRC (Radio Resource Control) layer. The radio resource control unit 1011 comprised in the higher layer processing unit 101 allocates the plurality of uplink carrier components and downlink carrier components to the mobile station apparatus 1 according to the number of downlink carrier components and uplink carrier components which can be used for wireless communication by the base station apparatus 3, and the number of downlink carrier components and uplink carrier components which can be simultaneously transmitted or received by the mobile station apparatus 1, etc.

In addition, the radio resource control unit 1011 generates information to be allocated in each channel of the each downlink carrier component, or obtains it from a higher node, and outputs it to the transmission unit 107. In addition, the radio resource control unit 1011 allocates to the mobile station apparatus 1a radio resource in which the mobile station apparatus 1 allocates the PUSCH (data information) of the radio resources of the uplink carrier component allocated to the mobile station apparatus 1. In addition, the radio resource control unit 1011 decides a radio resource in which the PDSCH (data information) is allocated among the radio resources of the downlink carrier component. The radio resource control unit 1011 generates downlink assignment and uplink grant indicating the radio resource allocation, and transmits them to the mobile station apparatus 1 through the transmission unit 107.

Note that the radio resource control unit 1011 controls an amount of a radio resource of the PUSCH to be allocated to the mobile station apparatus 1 based on a remaining power value (PH) with respect to the PUSCH received from the mobile station apparatus 1. Hereinafter, a PH with respect to the PUSCH is simply referred to as the PH in the first to fourth embodiments. Specifically, when a PH received from the mobile station apparatus 1 is positive, the base station apparatus 3 determines that the mobile station apparatus 1 still has remaining transmit power, and allocates much more radio resources for PUSCH transmission to the mobile station apparatus 1, and when the PH received from the mobile station apparatus 1 is negative, the base station apparatus 3 determines to have requested to the mobile station apparatus 1 transmit power exceeding a maximum transmit power value of the mobile station apparatus 1, and allocates much less radio resources for PUSCH transmission to the mobile station apparatus 1.

In addition, the radio resource control unit 1011 generates control information in order to control the reception unit 105 and the transmission unit 107 based on UCI (ACK/NACK, channel quality information, an SR) informed through the PUCCH by the mobile station apparatus 1, and a buffer condition informed from the mobile station apparatus 1, and various setting information of the each mobile station apparatus 1 set by the radio resource control unit 1011, and outputs the control information to the control unit 103.

The power headroom setting unit 1013 sets, for each mobile station apparatus 1, a periodicPHR-Timer, a prohibit-PHR-Timer, a dl-PathlossChange, downlink carrier component on which path losses are monitored in order to control a PH, and a maximum transmit power value for each uplink carrier component, generates information regarding the setting, and transmits it to the mobile station apparatus 1 through the transmission unit 107. Note that the maximum transmit power value is the maximum power value which can be used in the mobile station apparatus 1 transmitting an uplink channel. In addition, the power headroom setting unit 1013 can also perform setting so that the mobile station apparatus 1 may not transmit the PH for each uplink carrier component.

The control unit 103 generates a control signal which performs control of the reception unit 105 and the transmission unit 107 based on the control information from the higher layer processing unit 101. The control unit 103 outputs the generated control signal to the reception unit 105 and the transmission unit 107, and performs control of the reception unit 105 and the transmission unit 107.

The reception unit 105 separates, demodulates, and decodes the received signal received from the mobile station apparatus 1 through the transmission/reception antenna 109 according to the control signal input from the control unit 103, and outputs the decoded information to the higher layer processing unit 101. The radio reception unit 1057 converts (down-converts) into an intermediate frequency the signal of the each uplink carrier component received through the transmission/reception antenna, removes an unnecessary frequency component, controls an amplification level so that a signal level is maintained appropriately, orthogonally demodulates the signal based on an in-phase component and an orthogonal component of the received signal, and converts the orthogonally demodulated analog signal into a digital signal. The radio reception unit 1057 removes a portion corresponding to a GI (Guard Interval) from the converted digital signal. The radio reception unit 1057 performs FFT (Fast Fourier Transform) with respect to the signal from which the GI has been removed, extracts a signal in the frequency domain, and outputs it to the multiplex separation unit 1055.

The multiplex separation unit 1055 separates the signals input from the radio reception unit 1057 into signals, such as the PUCCH, the PUSCH, and the UL RS for each uplink carrier component, respectively. Note that this separation is performed based on the allocation information of the radio resource which the base station apparatus 3 has previously decided and has informed each mobile station apparatus 1. In addition, the multiplex separation unit 1055 calculates an estimate value of a channel from the separated UL RS, and compensates for the channel of the PUCCH and the PUSCH.

The demodulation unit 1053 performs IDFT (Inverse Discrete Fourier Transform) of the PUSCH, obtains a modulation symbol, and demodulates the received signal with respect to each modulation symbol of the PUCCH and the PUSCH using a predetermined modulation scheme or a modulation scheme which the base station apparatus 3 has previously informed the each mobile station apparatus 1 in the uplink grant, such as BPSK (Binary Phase Shift Keying), QPSK (Quadrature Phase Shift Keying), 16QAM (16 Quadrature Amplitude Modulation), and 64QAM (64 Quadrature Amplitude Modulation). The decoding unit 1051 decodes the demodulated encoded bits of the PUCCH and the PUSCH using a coding rate of a predetermined coding scheme which is predetermined or previously informed to the mobile station apparatus 1 by the base station apparatus 3 in the uplink grant, and outputs the decoded data information and the UCI to the higher layer processing unit 101.

The transmission unit 107 generates a DL RS according to the control signal input from the control unit 103, encodes and modulates the data information and the DCI which have been input from the higher layer processing unit 101, multiplexes the PDCCH, the PDSCH, and the DL RS, and transmits the signal to the mobile station apparatus 1 through the transmission/reception antenna 109. The coding unit 1071 performs coding, such as turbo coding, convolution coding, block coding, of the DCI of each downlink carrier component and data information which have been input from the higher layer processing unit 101. The modulation unit 1073 modulates the coded bit using a modulation scheme, such as QPSK, 16QAM, and 64QAM. The DL RS generation unit 1079 generates as a DL RS a known sequence of the mobile station apparatus 1 which can be calculated by a rule predetermined based on a cell ID for identifying the base station apparatus 3. The multiplexing unit 1075 multiplexes each modulated channel and the generated DL RS.

The radio transmission unit 1077 performs IFFT (Inverse Fast Fourier Transform) of the multiplexed modulation symbol to thereby perform modulation of an OFDM system, adds a GI to the OFDM-modulated OFDM symbol, generates a digital signal of a baseband, converts the digital signal of the baseband into an analog signal, generates an in-phase component and an orthogonal component of an intermediate frequency from the analog signal, removes an excessive frequency component with respect to an intermediate frequency band, converts (up-converts) a signal with the intermediate frequency into a signal with a high frequency, removes an excessive frequency component, amplifies power, and outputs the signal to the transmission/reception antenna 109 to transmit.

<Regarding Configuration of Mobile Station Apparatus 1>

Figure 2:
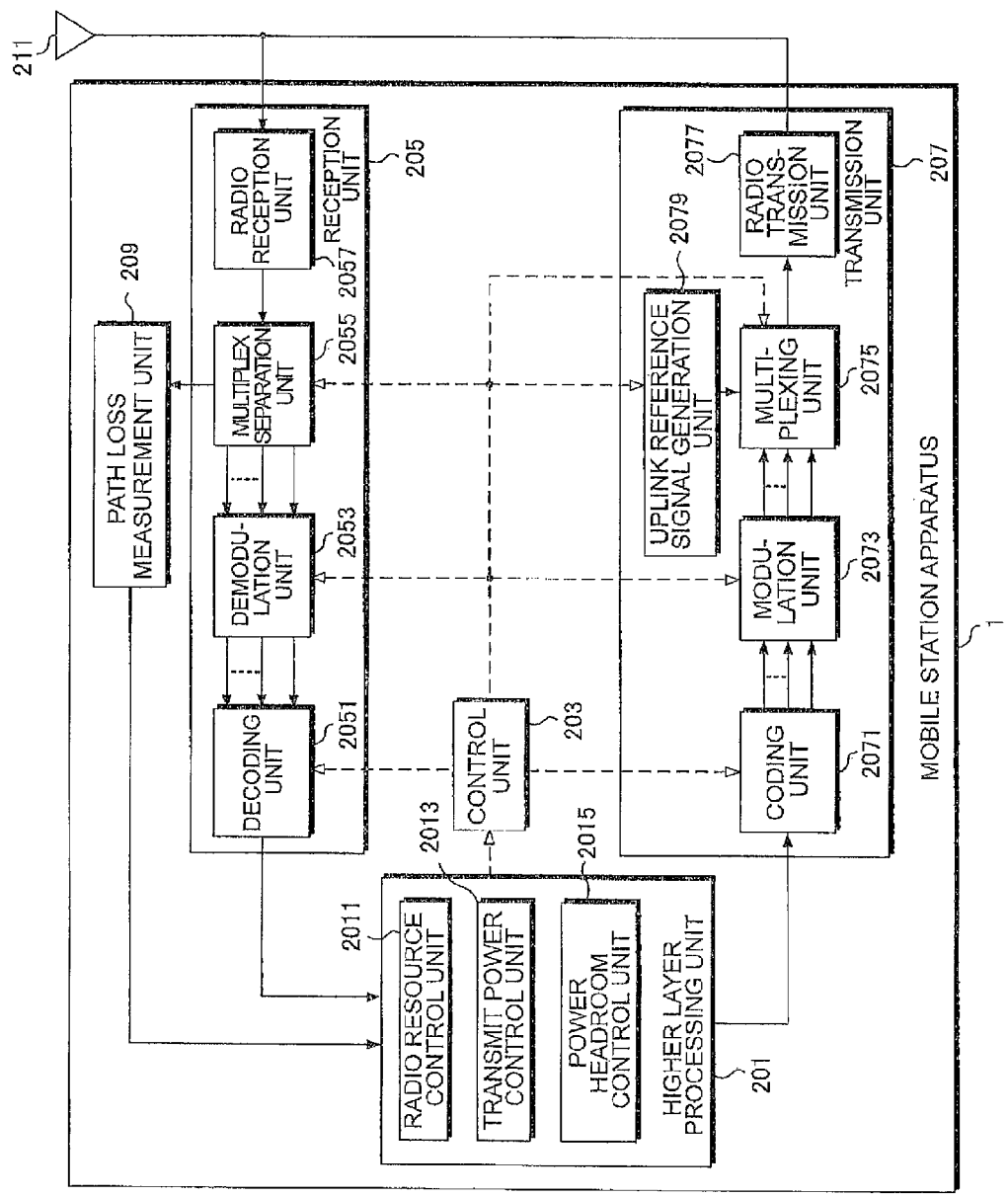
FIG. 2 is a schematic block diagram showing a configuration of a mobile station apparatus 1 of the present invention.

FIG. 2 is a schematic block diagram showing a configuration of the mobile station apparatus 1 of the present invention. As shown in the drawing, the mobile station apparatus 1 is configured to include a higher layer processing unit 201, a control unit 203, a reception unit 205, a transmission unit 207, a path loss measurement unit 209, and a transmission/reception antenna 211. In addition, the higher layer processing unit 201 is configured to include a radio resource control unit 2011, a transmit power control unit 2013, and a power headroom control unit 2015. In addition, the reception unit 205 is configured to include a decoding unit 2051, a demodulation unit 2053, a multiplex separation unit 2055, and a radio reception unit 2057. In addition, the transmission unit 207 is configured to include a coding unit 2071, a modulation unit 2073, a multiplexing unit 2075, a radio transmission unit 2077, and a UL RS generation unit 2079. Note that in FIG. 2, the mobile station apparatus 1 performs reception of a plurality of downlink carrier components, and transmission of a plurality of uplink carrier components through the one transmission/reception antenna 211.

The higher layer processing unit 201 outputs data information for each uplink carrier component generated by user operation etc. to the transmission unit 207. In addition, the higher layer processing unit 201 performs processing of the PDCP layer, the RLC layer, and the RRC layer. The radio resource control unit 2011 comprised in the higher layer processing unit 201 manages various setting information, such as the downlink carrier component and the uplink carrier component, assigned to the mobile station apparatus 1 itself. In addition, the radio resource control unit 2011 generates information to be allocated in each channel of the each uplink carrier component, and outputs it to the transmission unit 207 for each uplink carrier component. The radio resource control unit 2011 generates control information in order to control the reception unit 205 and the transmission unit 207 based on the DCI (for example, downlink assignment, and uplink grant) informed through the PDCCH by the base station apparatus 3, and various setting information of the mobile station apparatus 1 itself managed by the radio resource control unit 2011, and outputs the control information to the control unit 203.

In the transmit power control unit 2013 comprised in the higher layer processing unit 201, transmit power $P_{req}$ for satisfying a predetermined communication quality for each uplink carrier component in the base station apparatus 3, and transmit power $P_{PUSCH}(i)$ of the PUSCH which is actually used by the mobile station apparatus 1 are calculated based on Formula (1) using a modulation scheme and radio resource allocation of the PUSCH which are informed by downlink assignment, a TPC command, a path loss of the downlink carrier component input from the path loss measurement unit 209, a parameter informed from the base station apparatus 3, etc. The transmit power of the PUSCH can also be represented as transmit power of UL-SCH (Uplink Shared CHannel) allocated in the PUSCH. The UL-SCH is a transport channel transmitted through the PUSCH.

When the transmit power control unit 2013 is instructed to calculate a PH from the power headroom control unit 2015, it calculates the PHs of all the uplink carrier components assigned from the base station apparatus 3 based on Formula (2), and transmits them to the base station apparatus 3 through the transmission unit 207. Note that a $M_{PUSCH}$ in calculating a PH is defined to be the number of PRBs for PUSCH transmission assigned to each of the uplink carrier components at a timing when the PH is transmitted. In addition, the PH calculated for each uplink carrier component is collectively configured as one MAC(Medium Access Control) CE (Control Element).

The power headroom control unit 2015 comprised in the higher layer processing unit 201 monitors change of one downlink carrier component informed from the base station apparatus 3 or of a path loss of the downlink carrier component which the mobile station apparatus 1 has accessed first, and controls transmission of the PH using two timers (the periodicPHR-Timer and the prohibitPHR-Timer) and one value dl-PathlossChange which have been informed from the base station apparatus 3. The mobile station apparatus 1 decides transmission of the PH in a case applied to at least one of items described hereinafter. Decision of transmission of the PH is also referred to as trigger of a PH report. Namely, the cases where the mobile station apparatus 1 decides transmission of the PH is the following: a case where the prohibitPHR-Timer has expired and further, a path loss changes more than the dl-PathlossChange [dB] in one downlink carrier component informed from the base station apparatus 3, or a downlink carrier component which the mobile station apparatus 1 has accessed first after the mobile station apparatus 1 transmitting the PH in an uplink radio resource (PUSCH) as initial transmission; a case where the periodicPHR-Timer has expired; and a case where a transmission functionality of the PH is configured or reconfigured by the higher layer, and thus configuration is not the configuration by which transmission of the PH cannot be performed.

When the mobile station apparatus 1 has decided transmission of the PH and further, decides to transmit the PH through the PUSCH based on a priority of a data signal at a timing of having been allocated with the uplink radio resource (PUSCH) used for initial transmission, the mobile station apparatus 1 instructs the transmit power control unit 2013 to calculate the PH and to output it to the transmission unit 207. In addition, the mobile station apparatus 1 starts or restarts the periodicPHR-Timer and the prohibitPHR-Timer.

The control unit 203 generates a control signal which performs control of the reception unit 205 and the transmission unit 207 based on the control information from the higher layer processing unit 201. The control unit 203 outputs the generated control signal to the reception unit 205 and the transmission unit 207, and performs control of the reception unit 205 and the transmission unit 207.

The reception unit 205 separates, demodulates, and decodes the received signal received from the base station apparatus 3 through the transmission/reception antenna 211 according to the control signal input from the control unit 203, and outputs the decoded information to the higher layer processing unit 101. The radio reception unit 2057 converts (down-converts) into an intermediate frequency the signal of the each downlink carrier component received through each transmission/reception antenna, removes an unnecessary frequency component, controls an amplification level so that a signal level may be maintained appropriately, orthogonally demodulates the signal based on an in-phase component and an orthogonal component of the received signal, and converts the orthogonally demodulated analog signal into a digital signal. The radio reception unit 2057 removes a portion corresponding to the GI from the converted digital signal, performs FFT with respect to the signal from which the GI has been removed, and extracts signals of the frequency domain.

The multiplex separation unit 2055 separates the extracted signals into the PDCCH, the PDSCH, and the DL RS for each downlink carrier component, respectively. Note that this separation is performed based on the radio resource allocation information informed by the downlink assignment. In addition, the multiplex separation unit 2055 calculates a channel estimation value from the separated DL RS, and compensates for the channel of the PDCCH and the PDSCH. In addition, the multiplex separation unit 2055 outputs the separated DL RS to the path loss measurement unit 209.

The demodulation unit 2053 demodulates the PDCCH in a QPSK modulation scheme, and outputs it to the decoding unit 2051. When the decoding unit 2051 tried to decode the PDCCH to succeed in decoding, it outputs the decoded DCI to the higher layer processing unit 201. The demodulation unit 2053 demodulates the PDSCH in the modulation scheme informed by downlink assignment, such as QPSK, 16QAM, and 64QAM, and outputs it to the decoding unit 2051. The decoding unit 2051 decodes a coding rate informed by the downlink assignment, and outputs the decoded data information to the higher layer processing unit 201.

The path loss measurement unit 209 measures a path loss for each downlink carrier component from the DL RS input from the multiplex separation unit 2055, and outputs the measured path loss to the higher layer processing unit 201.

The transmission unit 207 generates a UL RS according to the control signal input from the control unit 203, encodes and modulates the data information input from the higher layer processing unit 201, multiplexes the PUCCH, the PUSCH, and the generated UL RS, and transmits them to the base station apparatus 3 through the transmission/reception antenna 211. The coding unit 2071 performs coding, such as turbo coding, convolution coding, block coding, of the UCI of each uplink carrier component and data information which has been input from the higher layer processing unit 201. The modulation unit 2073 modulates the encoded bit input from the coding unit 2071 in the modulation scheme, such as BPSK, QPSK, 16QAM, and 64QAM.

The UL RS generation unit 2079 generates as a UL RS a known sequence of the base station apparatus 3 which can be calculated by a rule predetermined based on a cell ID for identifying the base station apparatus 3. The multiplexing unit 2075 performs DFT (Discrete Fourier Transform) after rearranging the modulation symbols of the PUSCH in parallel, and multiplexes the PUCCH, the signal of the PUSCH, and the generated UL RS. The radio transmission unit 2077 performs IFFT of the multiplexed signal to modulate using an SC-FDMA system, adds the GI to the SC-FDMA-modulated SC-FDMA symbol, generates a digital signal of a baseband, converts the digital signal of the baseband into an analog signal, generates an in-phase component and an orthogonal component of an intermediate frequency from the analog signal, removes an excessive frequency component with respect to an intermediate frequency band, converts (up-converts) a signal with the intermediate frequency into a signal with a high frequency, removes an excessive frequency component, amplifies power, and outputs the signal to the transmission/reception antenna 211 to transmit.

<Regarding Operation of Wireless Communication System>

Figure 3:
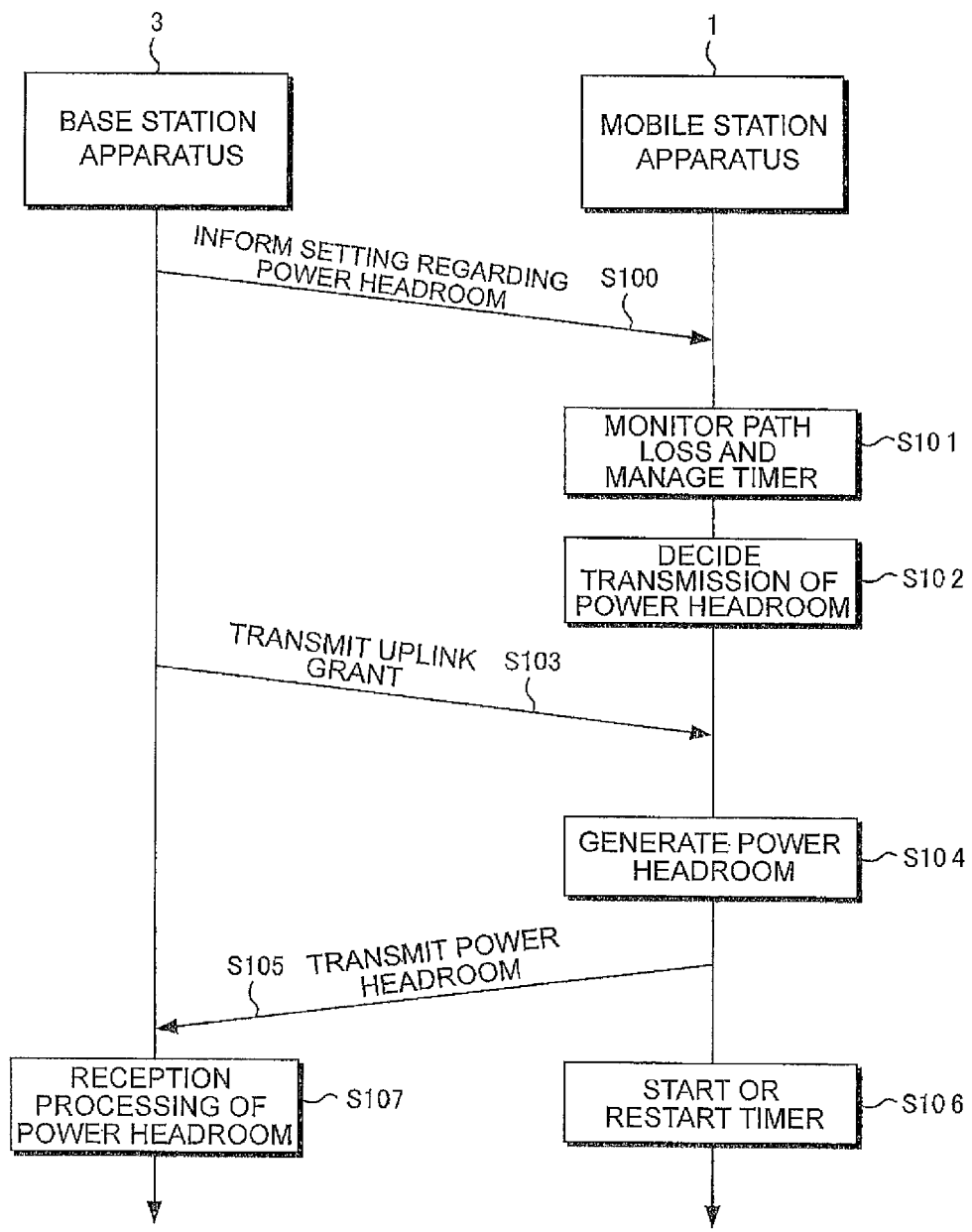
FIG. 3 is a sequence chart showing one example of operations of the mobile station apparatus 1 and the base station apparatus 3 of the present invention.

FIG. 3 is a sequence chart showing one example of operations of the mobile station apparatus 1 and the base station apparatus 3 of the present invention. The base station apparatus 3 informs the mobile station apparatus 1 of information including setting regarding PHs, such as the maximum transmit power value for each uplink carrier component, periodicPHR-Timer, the prohibitPHR-Timer, the dl-Pathloss-Change, and a downlink carrier component on which a path loss is monitored in order to control the PH (step S100). The mobile station apparatus 1 monitors the path loss of the downlink carrier component informed from the base station apparatus 3, and manages the periodicPHR-Timer and the prohibitPHR-Timer which have been informed from the base station apparatus 3 (step S101).

The mobile station apparatus 1 monitors the path loss of the downlink carrier component informed from the base station apparatus 3, and when the prohibitPHR-Timer has expired and further, the path loss changes more than the dl-Pathloss-Change [dB] in the downlink carrier component informed from the base station apparatus 3 after the mobile station apparatus 1 transmits the PH in the uplink radio resource (PUSCH) as initial transmission, or when the periodicPHR-Timer has expired, or when the transmission functionality of the PH is configured or reconfigured by the higher layer, and configuration is not the configuration by which transmission of the PH cannot be performed, the mobile station apparatus decides transmission of the PH (step S102).

The base station apparatus 3 transmits to the mobile station apparatus 1 uplink grant indicating radio resource assignment of the PUSCH for initial transmission, etc. (step S103). When the mobile station apparatus 1 has decided transmission of the PH and is allocated with the radio resource of the PUSCH for initial transmission, it calculates the PHs with respect to all the uplink carrier components assigned by the base station apparatus 3 (step S104). As is mentioned later, when the radio resource for initial transmission or retransmission is not assigned to the uplink carrier component in step S104, the mobile station apparatus calculates a PH, determining that the predetermined number of PRBs has been assigned to the uplink carrier component.

The mobile station apparatus 1 transmits the calculated PH using the PUSCH to which the radio resource for initial transmission has been assigned (step S105), and starts or restarts the periodicPHR-Timer and the prohibitPHR-Timer (step S106). The base station apparatus 3 receives the PUSCH which has assigned the radio resource to the mobile station apparatus 1 in step S103, and obtains the PH (step S107). The mobile station apparatus 1 completes processing regarding transmission and reception of the PH after steps S106 and S107, and returns to monitoring of the path loss in step S101 and to management of a timer.

Note that although the base station apparatus 3 informs the mobile station apparatus 1 of the uplink carrier component to which frequency band aggregation is performed in the embodiment, the base station apparatus 3 may inform the mobile station apparatus 1 of only the downlink carrier component used for wireless communication, and the mobile station apparatus 1 may use for frequency band aggregation the uplink carrier component to which the informed downlink carrier component corresponds. In this case, information indicating the uplink carrier component corresponding to the downlink carrier component is informed or broadcasted to the mobile station apparatus 1 from the base station apparatus 3.

As shown in FIG. 8 when the downlink carrier components to which frequency band aggregation is performed are configured in the contiguous frequency domain, path losses of the downlink carrier components indicate values approximate to each other, and if a path loss of any downlink carrier component is known, the path losses of the other downlink carrier components can be estimated. Hence, it is only necessary that the mobile station apparatus 1 measures a path loss of one downlink carrier component, and monitors change of the path loss for controlling a PH in the one downlink carrier component.

As described above, according to the embodiment, the mobile station apparatus 1 manages a PH, which is a difference between a maximum transmit power value set for each uplink carrier component and a predetermined power value estimated for uplink transmission, monitors a path loss of a predetermined downlink carrier component of the plurality of downlink carrier components, and when a path loss of a certain downlink carrier component changes more than a predetermined value, the mobile station apparatus 1 decides transmission of the PHs for uplink transmission corresponding to all the downlink carrier components set by the base station apparatus 3. As a result of this, since the number of downlink carrier components which the mobile station apparatus 1 monitors the change of the path loss can be reduced, load of the mobile station apparatus 1 in monitoring the change of the path loss can be reduced, and timers can be managed in common in all the downlink carrier components, thus resulting in easy management of the timers.

Second Embodiment

Hereinafter, a second embodiment of the present invention will be described. In the second embodiment of the present invention, a case will be described where the mobile station apparatus 1 monitors the change of the path losses of all the downlink carrier components assigned by the base station apparatus 3. When compared a wireless communication system according to the embodiment with the wireless communication system according to the first embodiment, there is a difference in the higher layer processing unit 201 of the mobile station apparatus 1 and the higher layer processing unit 101 of the base station apparatus 3. However, since configurations and functions of the other components are the same as in the first embodiment, a description of the same functions as in the first embodiment is omitted.

When compared with the power headroom setting unit 1013 of the higher layer processing unit 101 of the base station apparatus 3 of the first embodiment, there is a difference in that the PH setting unit 1013 of the higher layer processing unit 101 of the base station apparatus 3 of the embodiment does not set a downlink carrier component in which a path loss is monitored to control a PH, and sets a different dl-PathlossChange for each downlink carrier component. Since the other functions of the power headroom setting unit 1013 according to the embodiment are the same as those of the power headroom setting unit 1013 according to the first embodiment, a description of the same functions as in the first embodiment is omitted.

When compared with the power headroom control unit 2015 of the higher layer processing unit 201 of the mobile station apparatus 1 of the first embodiment, there is a difference in that the power headroom control unit 2015 of the higher layer processing unit 201 of the mobile station apparatus 1 of the embodiment monitors the change of the path losses of all the downlink carrier components assigned from the base station apparatus 3. In addition, there is a difference in that the mobile station apparatus 1 decides transmission of the PH in a case applied to an item described hereinafter. Namely, it is the case where the prohibitPHR-Timer has expired, and the path loss has changed more than the dl-PathlossChange [dB] set for each downlink carrier component in at least one of the downlink carrier components assigned from the base station apparatus 3 after the mobile station apparatus 1 transmits the PH as initial transmission.

Since the other functions of the power headroom control unit 2015 according to the embodiment are the same as those of the power headroom control unit 2015 according to the first embodiment, a description of the same functions as in the first embodiment is omitted.

Figure 4:
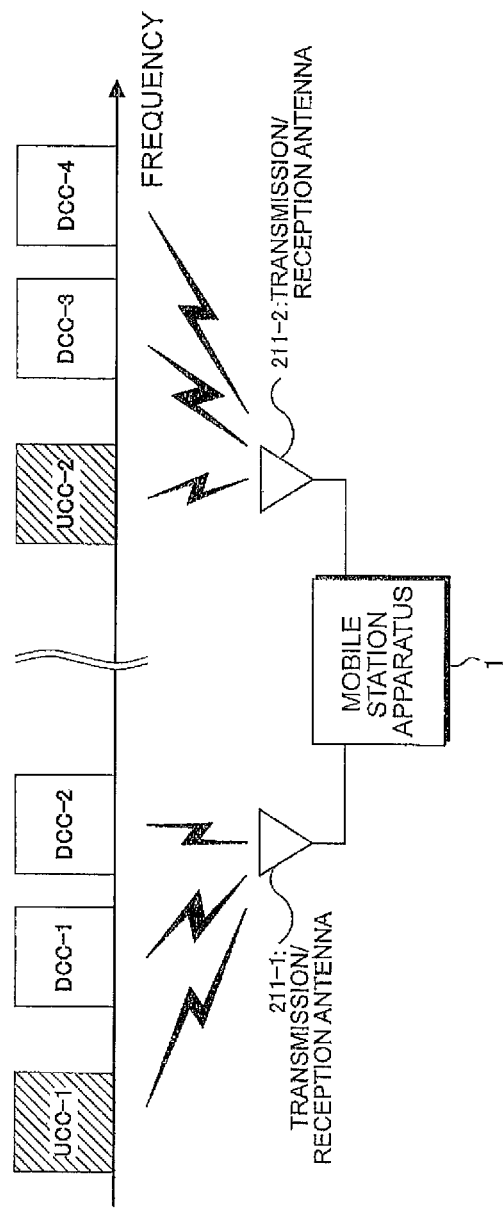
FIG. 4 is a diagram showing one example of a configuration of carrier components according to a second embodiment of the present invention.

FIG. 4 is a diagram showing one example of a configuration of carrier components according to the second embodiment of the present invention. In FIG. 4, a horizontal axis indicates a frequency domain, the DCC-1, the DCC-2, and the UCC-1 are comprised of carrier components of contiguous frequency bands in the frequency domain, the DCC-3, the DCC-4, and the UCC-2 are comprised of CCs of contiguous frequency bands in the frequency domain, and a group of the DCC-1, the DCC-2, and the UCC-1, and a group of the DCC-3, the DCC-4, and the UCC-2 are configured in frequency domains spaced apart from each other in the frequency domain.

As described above, since the downlink carrier components largely spaced apart from each other in the frequency domain differ in an effect of the path loss, it becomes possible to efficiently control the PH by setting the different dl-PathlossChange for each downlink carrier component as in the embodiment. For example, a large value of dl-PathlossChange may be set to the downlink carrier component in which the path loss easily changes due to moving of the mobile station apparatus 1, a small value of dl-PathlossChange may be set to the downlink carrier component in which the path loss does not easily change.

In addition, when frequencies of the downlink carrier components are largely spaced apart as shown in FIG. 4, the mobile station apparatus 1 may transmit signals of the plurality of downlink carrier components using different antennas and PAs. For example, in FIG. 4, the transmission/reception antenna 211 and the PA of the mobile station apparatus 1 which are used for transmission and reception of signals differ in the DCC-1, the DCC-2, and the UCC-1, and the DCC-3, the DCC-4, and the UCC-2. As described above, when the different transmission/reception antennas 211-1 and 211-2 are used according to the downlink carrier components, imbalance may occur in antenna gain. For example, since it can be considered that rapid change of the path losses in only a part of antennas due to an effect of an obstacle, the mobile station apparatus 1 can accurately control transmission of the PH by monitoring the change of the path losses of all the downlink carrier components set by the base station apparatus 3 for using for wireless communication.

Note that since only the path losses of the part of the downlink carrier components may change rapidly also when the base station apparatus 3 cannot determine that the mobile station apparatus 1 is performing wireless communication using what kind of configuration of the transmission/reception antenna 211, the mobile station apparatus 1 can accurately control transmission of the PH regardless of the configuration of the transmission/reception antenna 211 of the mobile station apparatus 1 by monitoring the change of the path losses of all the downlink carrier components assigned by the base station apparatus 3.

Note that although the mobile station apparatus 1 monitors the change of the path loss of one downlink carrier component in the first embodiment, and the mobile station apparatus 1 monitors the path losses of all the downlink carrier components set by the base station apparatus 3 in the second embodiment, the base station apparatus 3 may set the number of downlink carrier components in which change of the path losses are monitored according to the configuration of the transmission/reception antenna 211 of the mobile station apparatus 1 to inform the mobile station apparatus 1. In this case, it is necessary to transmit to the base station apparatus 3 information indicating the configuration of the transmission/reception antenna 211 of the mobile station apparatus itself, or to infer the configuration of the transmission/reception antenna 211 of the mobile station apparatus 1 from information, such as the PH which the base station apparatus 3 receives from the mobile station apparatus 1. As a result of this, it becomes possible to perform an efficient control of transmission of the PH according to the configuration of the transmission/reception antenna 211 of the mobile station apparatus 1.

Note that although the PH has been calculated for each uplink carrier component in the first and second embodiments, as the PH, may be calculated a value obtained by subtracting from the maximum transmit power value of the mobile station apparatus 1a total of predetermined power values estimated for the uplink transmission of the uplink carrier components to which the transmission/reception antenna 211 and the PA comprised in the mobile station apparatus 1. As a result of this, the base station apparatus 3 can recognize remaining power for each PA comprised in the mobile station apparatus 1, and thus power control in the uplink according to the configuration of the PA of the mobile station apparatus 1 can be performed.

Note that although as one MAC CE, have been configured the PHs of all the uplink carrier components assigned to the mobile station apparatus 1 by the base station apparatus, or of all the uplink carrier components corresponding to the downlink carrier components assigned to the mobile station apparatus 1 by the base station apparatus 3 in the first and second embodiments, the different MAC CE for each PH may be configured. In this case, when the mobile station apparatus 1 transmits all the MAC CE including the PHs, the power headroom control unit 2015 starts or restarts the periodicPHR-Timer and the prohibitPHR-Timer. Namely, even though the mobile station apparatus transmits the PH of the part of the uplink carrier components, the power headroom control unit 2015 does not start and restart the periodicPHR-Timer and the prohibitPHR-Timer. Alternatively, when the mobile station apparatus 1 transmits all the PHs regarding the uplink carrier components corresponding to the downlink carrier components in which the path losses have changed more than the dl-PathlossChange [dB], the PH control unit 2015 may start or restart the periodicPHR-Timer and the prohibitPHR-Timer.

Third Embodiment

Hereinafter, a third embodiment of the present invention will be described. In the third embodiment of the present invention, will be described a method for calculating a PH when no PRB for PUSCH transmission is assigned to a certain uplink carrier component at a timing when the mobile station apparatus 1 transmits a PH corresponding to the uplink carrier component. When compared a wireless communication system according to the embodiment with the wireless communication system according to the first embodiment, there is a difference in the transmit power control unit 2013 of the mobile station apparatus 1 and the radio resource control unit 1011 of the base station apparatus 3. However, since configurations and functions of the other components are the same as in the first embodiment, a description of the same functions as in the first embodiment is omitted.

In the first embodiment, in the transmit power control unit 2013 of the mobile station apparatus 1, a $M_{PUSCH}$ in calculating a PH from Formula (2) is defined to be the number of PRBs for PUSCH transmission assigned to the uplink carrier component to which the PH corresponds at a timing when the PH is transmitted. However, when the PRB for PUSCH transmission is not assigned to the uplink carrier component at a timing of transmitting a PH corresponding to a certain uplink carrier component (i.e., a timing when the mobile station apparatus 1 has decided transmission of the PH, a PUSCH for initial transmission has been assigned to any uplink carrier component, and/or the mobile station apparatus 1 decides to transmit the PH in the PUSCH based on priority of a data signal), i.e., when the $M_{PUSCH}$ is "0", there is a problem that the PH cannot be calculated from Formula (2).

Consequently, when the PRB for PUSCH transmission is not assigned to a certain uplink carrier component at a timing of transmitting the PH corresponding to the uplink carrier component, the transmit power control unit 2013 of the mobile station apparatus 1 of the third embodiment calculates the PH, determining that the predetermined number (for example, "1", or the number of PRBs assigned at the last minute for PUSCH transmission in the uplink carrier component to which the PH corresponds, or the number of PRBs assigned to the PUSCH in the uplink carrier component in which the PH is transmitted, etc.) of PRBs for PUSCH transmission has been assigned to the uplink carrier component. Namely, the transmit power control unit 2013 calculates the PH, determining that the $M_{PUSCH}$ is a predetermined value.

Figure 5:
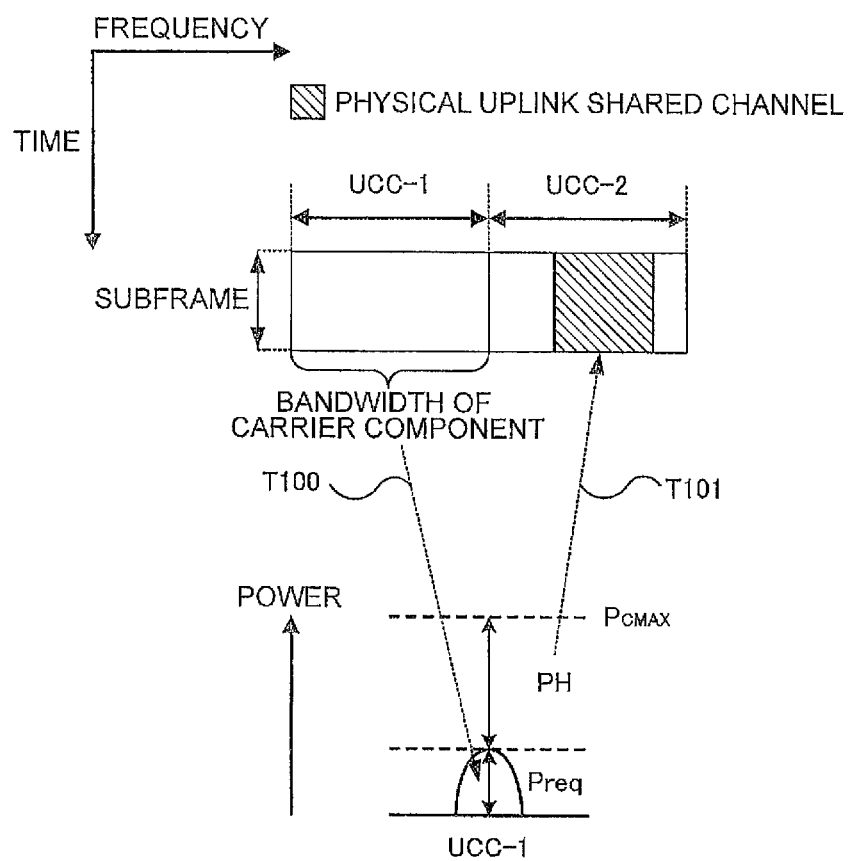
FIG. 5 is a diagram illustrating one example of a calculation method of a PH according to a third embodiment of the present invention.

FIG. 5 is a diagram illustrating one example of a calculation method of a PH according to the third embodiment of the present invention. Two uplink carrier components (UCC-1 and UCC-2) are shown in FIG. 5. In these two uplink carrier components, a horizontal axis indicates a frequency domain, a vertical axis indicates a time domain, and a region hatched with oblique lines indicates a radio resource for PUSCH transmission assigned to the UCC-2. In addition, in FIG. 5, shown are transmit power $P_{req}$ of the PUSCH of the UCC-1, a maximum transmit power value $P_{CMAX}$ of the UCC-1, and a power headroom PH of the UCC-1 which are calculated by the transmit power control unit 2013. Here, as for the transmit power $P_{req}$, the maximum transmit power value $P_{CMAX}$, and the power headroom PH, a vertical axis indicates power.

When the transmit power control unit 2013 calculates a PH of the UCC-1 in the uplink carrier component, UCC-1, to which the radio resource for PUSCH transmission in FIG. 5 is not assigned, it calculates the transmit power $P_{req}$ of the PUSCH, determining that the predetermined number (for example, "1", or the number of PRBs assigned at the last minute for PUSCH transmission in the uplink carrier component to which the PH corresponds, or the number of PRBs assigned to the PUSCH in the uplink carrier component in which the PH is transmitted, etc.) of PRBs for PUSCH transmission has been assigned to the UCC-1 (step T100). Next, the transmit power control unit 2013 calculates the power headroom PH from Formula (2) using the transmit power $P_{req}$ of the PUSCH of the UCC-1 and the maximum transmit power value $P_{CMAX}$ of the UCC-1, and the mobile station apparatus 1 transmits the PH of the UCC-1 in the PUSCH of the UCC-2 (step T101).

In addition, when the radio resource control unit 1011 of the base station apparatus 3 of the third embodiment receives a PH of an uplink carrier component to which the PRB for PUSCH transmission is not assigned, it determines that the received PH is the PH which the transmit power control unit 2013 of the mobile station apparatus 1 calculates supposing that the predetermined number of PRBs for PUSCH transmission has been assigned.

As a result of this, the mobile station apparatus 1 can calculate the PH from Formula (2) also when the PRB for PUSCH transmission is not assigned to a certain uplink carrier component at the timing of transmitting the PH corresponding to the uplink carrier component.

Note that the calculation method of the PH can be applied also when the mobile station apparatus transmits each PH report corresponding to the uplink carrier component at different timings. In addition, the calculation method can be applied also when the mobile station apparatus 1 transmits the PH corresponding to one uplink carrier component. In addition, the calculation method can be applied also when the mobile station apparatus 1 monitors a path loss and/or change of the path loss in one or more downlink carrier components. In addition, the calculation method can be applied also when the base station apparatus 3 selects the uplink carrier component in which the PH is transmitted to inform the mobile station apparatus.

Fourth Embodiment

Hereinafter, a fourth embodiment of the present invention will be described. In the third embodiment of the present invention, will be described a method for calculating a PH when the mobile station apparatus 1 transmits the PH corresponding to a certain uplink carrier component in a PUSCH assigned to a different uplink carrier component. When compared a wireless communication system according to the embodiment with the wireless communication system according to the first embodiment, there is a difference in the transmit power control unit 2013 of the mobile station apparatus 1 and the radio resource control unit 1011 of the base station apparatus 3. However, since configurations and functions of the other components are the same as in the first embodiment, a description of the same functions as in the first embodiment is omitted.

In the first embodiment, in the transmit power control unit 2013 of the mobile station apparatus 1, a $M_{PUSCH}$ in calculating a PH from Formula (2) is defined to be the number of PRBs for PUSCH transmission assigned to the uplink carrier component to which the PH corresponds at a timing when the PH is transmitted. However, when the mobile station apparatus 1 fails to detect uplink grant although the base station apparatus 3 assigns a radio resource to a certain uplink carrier component, and transmits the uplink grant indicating the radio resource assignment to the mobile station apparatus 1, the mobile station apparatus 1 determines that the radio resource is not assigned to the uplink carrier component, calculates a PH to transmit, but the base station apparatus 3 recognizes that it has received the PH calculated based on the radio resource assigned by the base station apparatus 3 itself, thus having caused a problem of different interpretations of the PH between the mobile station apparatus 1 and the base station apparatus 3.

Consequently, when a PH corresponding to a certain uplink carrier component is transmitted in a PUSCH assigned to a different uplink carrier component, the transmit power control unit 2013 of the mobile station apparatus 1 of the fourth embodiment calculates the PH, determining that the predetermined number (for example, the number of PRBs assigned to the PUSCH in the uplink carrier component in which the PH is transmitted, etc.) of PRBs for PUSCH transmission. Namely, the transmit power control unit 2013 calculates the PH, determining that the $M_{PUSCH}$ is a predetermined value.

In addition, when the radio resource control unit 1011 of the base station apparatus 3 of the fourth embodiment receives the PH corresponding to the certain uplink carrier component in the PUSCH assigned to the different uplink carrier component, it determines that the received PH is the PH which the transmit power control unit 2013 of the mobile station apparatus 1 calculates supposing that the predetermined number of PRBs for PUSCH transmission has been assigned.

As a result of this, also when the mobile station apparatus 1 fails to detect the uplink grant transmitted by the base station apparatus 3, it can be avoided that interpretations of the PH between the mobile station apparatus 1 and the base station apparatus 3 are different from each other.

Note that the calculation method of the PH can be applied also when the mobile station apparatus transmits each PH report corresponding to the uplink carrier component at different timings. In addition, the calculation method can be applied also when the mobile station apparatus 1 transmits the PH corresponding to one uplink carrier component. In addition, the calculation method can be applied also when the mobile station apparatus 1 monitors a path loss and/or change of the path loss in one or more downlink carrier components. In addition, the calculation method can be applied also when the base station apparatus 3 selects the uplink carrier component in which the PH is transmitted to inform the mobile station apparatus.

Fifth Embodiment

Hereinafter, a fifth embodiment of the present invention will be described. In the fifth embodiment of the present invention, will be described a method in which the mobile station apparatus 1 transmits a PH (first remaining power value) of the PUSCH and/or a PH (second remaining power value) of the PUCCH. When compared a wireless communication system according to the embodiment with the wireless communication system according to the first embodiment, there is a difference in the transmit power control unit 2013 of the mobile station apparatus 1 and the radio resource control unit 1011 of the base station apparatus 4. However, since configurations and functions of the other components are the same as in the first embodiment, a description of the same functions as in the first embodiment is omitted.

In Chapter 6 in Non-patent Document 3, simultaneous transmission of a PUSCH and a PUCCH in LTE-A is described. When the PUSCH and the PUCCH are transmitted simultaneously, if a transmit power value of the PUCCH transmitted by the mobile station apparatus 1 is unknown, the base station apparatus 3 cannot determine how many PRBs it may assign as a radio resource for PUSCH transmission to the mobile station apparatus 1 which simultaneously transmits the PUCCH and the PUSCH. Consequently, although the mobile station apparatus 1 needs to transmit the PH of the PUCCH to the base station apparatus 3, a calculation method and a transmission method of the PH of the PUCCH have been indefinite. Consequently, a calculation method and a transmission method of the PH of the PUCCH are provided in the fifth embodiment.

When the transmit power control unit 2013 of the mobile station apparatus 1 of the fifth embodiment is instructed to calculate a PH by the power headroom control unit 2015, it calculates the PHs of the PUSCHs of all the uplink carrier components assigned from the base station apparatus 3 based on Formula (2), and transmits them to the base station apparatus 3 through the transmission unit 207. In addition, the transmit power control unit 2013 calculates PHs of the PUCCHs of all the uplink carrier components assigned from the base station apparatus 3, or of the uplink carrier component (Note that the base station apparatus 3 may inform the mobile station apparatus 1 of this uplink carrier component.) to which a radio resource for PUCCH transmission (radio resource for control information transmission) has been assigned from the base station apparatus 3 based on Formula (4), and transmits the PHs to the base station apparatus 3 through the transmission unit 207.

[Formula 4]

$$PH_{PUCCH}(i) = P_{CMAX} - \{P_{O\_PUCCH}(j) + PL + h(n_{CQI}, n_{HARQ}) + \Delta_{F\_PUCCH}(F) + g(i)\} \quad (4)$$
$$= P_{CMAX} - P_{req\_PUCCH}$$

When a PH of the PUCCH is calculated by Formula (4), h ($n_{CQI}$, $n_{HARQ}$) and $\Delta_{F\_PUCCH}$ are calculated as a predetermined PUCCH format and the predetermined number of bits (for example, HARQ bit is 1 bit in a PUCCH format 1a, or channel quality information is 4 bits in a PUCCH format 2). Alternatively, when the PUCCH is transmitted in the uplink carrier component to which the PH of the PUCCH corresponds at a timing when the PH of the PUCCH is transmitted, the PH of the PUCCH may be calculated from Formula (4) using the format and the number of bits of the PUCCH transmitted by the timing and in the uplink carrier component. The radio resource control unit 1011 of the base station apparatus 3 of the fifth embodiment controls a transmit power value when the mobile station apparatus 1 simultaneously transmits the PUCCH and the PUSCH based on the PH of the PUCCH, and the PH of the PUSCH.

As a result of this, the mobile station apparatus 1 can calculate the PH of the PUCCH corresponding to a certain uplink carrier component to transmit to the base station apparatus 3, and the base station apparatus 3 can control the number of PRBs assigned for PUSCH transmission from the PH of the PUCCH, and the PH of the PUSCH.

Note that the calculation method of the PH can be applied also when the mobile station apparatus transmits each PH report corresponding to the uplink carrier component at different timings. In addition, the calculation method can be applied also when the mobile station apparatus 1 transmits the PH corresponding to one uplink carrier component. In addition, the calculation method can be applied also when the mobile station apparatus 1 monitors a path loss and/or change of the path loss in one or more downlink carrier components. Note that the calculation method can be applied also when the PH of the PUCCH and the PH of the PUSCH are configured as different MAC CEs. In addition, the calculation method can be applied also when the PH of the PUCCH and the PH of the PUSCH are configured as the same MAC CE. In addition, the calculation method can be applied also when two or more of the above-described conditions are combined with each other.

(1) In order to achieve the above-described object, the present invention has taken the following measures. Namely, a wireless communication system of the present invention is the wireless communication system in which a base station apparatus and a mobile station apparatus perform wireless communication using a plurality of component carriers, and the wireless communication system is characterized in that the mobile station apparatus manages a power headroom which is a difference between a maximum transmit power value determined for each uplink component carrier from the base station apparatus and a predetermined power value estimated for uplink transmission, monitors a path loss of the downlink component carrier informed from the base station apparatus among a plurality of downlink component carriers, and when a path loss value of any downlink component carrier changes more than a predetermined value, the mobile station apparatus decides transmission to the base station apparatus of the power headroom for uplink transmission corresponding to all the downlink component carriers set from the base station apparatus.

As described above, since the mobile station apparatus monitors the path loss of the downlink component carrier informed from the base station apparatus, it can reduce the number of downlink component carriers in which change of the path losses are monitored, load of the mobile station apparatus in monitoring the change of the path losses can be reduced, and timers can be managed in common in all the downlink component carriers, thus resulting in easy management of the timers.

(2) In addition, a mobile station apparatus of the present invention is the mobile station apparatus in which a base station apparatus and a mobile station apparatus perform wireless communication using a plurality of component carriers, and the mobile station apparatus comprising: a power headroom control unit which manages a power headroom which is a difference between a maximum transmit power value determined for each uplink component carrier from the base station apparatus and a predetermined power value estimated for uplink transmission; and a path loss measurement unit monitors a path loss of a downlink component carrier informed from the base station apparatus among the plurality of downlink component carriers, and the mobile station apparatus is characterized in that when a path loss value of any downlink component carrier changes more than a predetermined value, the power headroom control unit decides transmission to the base station apparatus of the power headroom for uplink transmission corresponding to all the downlink component carriers set from the base station apparatus.

As described above, since the mobile station apparatus 1 monitors a path loss of the downlink component carrier informed from the base station apparatus among the plurality of downlink component carriers, it can reduce the number of downlink component carriers in which change of the path losses are monitored, load of the mobile station apparatus in monitoring the change of the path losses can be reduced, and timers can be managed in common in all the downlink component carriers, thus resulting in easy management of the timers.

(3) In addition, a mobile station apparatus of the present invention is characterized in that the mobile station apparatus is informed of any one of the plurality of downlink component carriers from the base station apparatus, and that the path loss measurement unit monitors a path loss of the informed any one of the downlink component carriers.

As described above, since the mobile station apparatus monitors the path loss of the informed any one of the downlink component carriers, it can reduce the number of downlink component carriers in which change of the path losses are monitored. In addition, when the downlink component carrier to which frequency band aggregation is performed is configured in contiguous frequency domains, path losses of the other downlink component carriers can be estimated from the path loss of the downlink component carrier.

(4) In addition, a mobile station apparatus of the present invention is characterized in that the path loss measurement unit monitors path losses of all the downlink component carriers assigned from the base station apparatus.

As described above, since the mobile station apparatus monitors the path losses of all the downlink component carriers assigned from the base station apparatus, it becomes possible to efficiently and accurately control the PH when effects of the path losses differ as in the downlink component carriers largely spaced apart from each other in the frequency domain.

(5) In addition, a mobile station apparatus of the present invention is characterized in that when a radio resource for uplink transmission is not assigned to an uplink component carrier at a time when the mobile station apparatus transmits the power headroom, the power headroom control unit calculates the power headroom, determining that a predetermined amount of radio resources is assigned to the uplink component carrier.

As described above, since the PH control unit calculates the power headroom, determining that the predetermined amount of radio resources is assigned to the uplink component carrier when the radio resource for uplink transmission is not assigned to the uplink component carrier at the time when the mobile station apparatus transmits the power headroom, the mobile station apparatus can calculate the PH using the method similar to a case where the radio resource is assigned.

(6) In addition, a mobile station apparatus of the present invention is characterized in that when the mobile station apparatus transmits the power headroom in an uplink component carrier other than an uplink component carrier to which the power headroom corresponds at a time of transmitting the power headroom, the power headroom control unit calculates the power headroom, determining that a predetermined amount of radio resources is assigned to the uplink component carrier.

As described above, since the PH control unit calculates the power headroom, determining that the predetermined amount of radio resources is assigned to the uplink component carrier when the mobile station apparatus transmits the power headroom in an uplink component carrier other than an uplink component carrier to which the power headroom corresponds, it can be avoided that interpretations of the PH between the mobile station apparatus and the base station apparatus are different from each other also when the mobile station apparatus fails to detect uplink grant transmitted by the base station apparatus.

(7) In addition, a mobile station apparatus of the present invention is characterized in that the mobile station apparatus further manages a second power headroom which is a difference between a maximum transmit power value set for each uplink component carrier from the base station apparatus and a predetermined power value estimated for uplink control information transmission, the power headroom control unit calculates the second power headroom, determining that a radio resource of a predetermined format is assigned to the uplink component carrier, and the predetermined number of bits is transmitted.

As described above, since the mobile station apparatus manages the second power headroom which is the difference between the maximum transmit power value set for each uplink component carrier from the base station apparatus and the predetermined power value estimated for uplink control information transmission, the mobile station apparatus can calculate a PH of a PUCCH corresponding to a certain uplink component carrier to transmit to the base station apparatus, and the base station apparatus can control the number of PRBs assigned for PUSCH transmission from the PH of the PUCCH, and a PH of a PUSCH.

(8) In addition, a base station apparatus of the present invention is the base station apparatus in which a base station apparatus and a mobile station apparatus perform wireless communication using a plurality of component carriers, and the base station apparatus is characterized in that the base station apparatus sets a downlink component carrier in which the mobile station apparatus described in (3) monitors a path loss, and that informs the mobile station apparatus of the set downlink component carrier.

As described above, since the base station apparatus informs the mobile station apparatus of the set downlink component carrier, the mobile station apparatus can monitor the path loss of the informed downlink component carrier.

(9) In addition, a base station apparatus of the present invention is the base station apparatus in which the base station apparatus and a mobile station apparatus perform wireless communication using a plurality of component carriers, and the base station apparatus is characterized in that the base station apparatus sets a predetermined value for monitoring a path loss value for each downlink component carrier, and that informs the mobile station apparatus described in (4) of the set each predetermined value.

As described above, since the base station apparatus sets the predetermined value for monitoring the path loss value for each downlink component carrier, it becomes possible to efficiently and accurately control the PH when effects of the path losses differ as in the downlink component carriers largely spaced apart from each other in the frequency domain.

(10) In addition, a wireless communication method of the present invention is the wireless communication method of a wireless communication system in which a base station apparatus and a mobile station apparatus perform wireless communication using a plurality of component carriers, and the wireless communication method is characterized in that the mobile station apparatus manages a power headroom which is a difference between a maximum transmit power value set for each uplink component carrier from the base station apparatus and a predetermined power value estimated for uplink transmission, monitors a path loss of the downlink component carrier informed from the base station apparatus among a plurality of downlink component carriers, and that when a path loss value of any downlink component carrier changes more than a predetermined value, the mobile station apparatus decides transmission to the base station apparatus of the power headroom for uplink transmission corresponding to all the downlink component carriers set from the base station apparatus.

As described above, since the mobile station apparatus monitors the path loss of the downlink component carrier informed from the base station apparatus among the plurality of downlink component carriers, it can reduce the number of downlink component carriers in which change of the path losses are monitored, load of the mobile station apparatus in monitoring the change of the path losses can be reduced, and timers can be managed in common in all the downlink component carriers, thus resulting in easy management of the timers.

(11) In addition, a control program of the present invention is the control program for a mobile station apparatus applied to a wireless communication system in which a base station apparatus and the mobile station apparatus perform wireless communication using a plurality of component carriers, and the control program is characterized in that has been made to be a computer-readable and computer-executable command a series of processing including the processing of: managing in a power headroom control unit a power headroom which is a difference between a maximum transmit power value set for each uplink component carrier from the base station apparatus and a predetermined power value estimated for uplink transmission; monitoring in a path loss measurement unit a path loss of a downlink component carrier informed from the base station apparatus among the plurality of downlink component carriers; and deciding transmission to the base station apparatus of the power headroom for uplink transmission corresponding to all the downlink component carriers set from the base station apparatus when a path loss value of any downlink component carrier changes more than a predetermined value in the power headroom control unit.

As described above, since the mobile station apparatus decides transmission to the base station apparatus of the power headroom for uplink transmission corresponding to all the downlink component carriers set from the base station apparatus when a path loss value of any downlink component carrier changes more than a predetermined value, it can reduce the number of downlink component carriers in which change of the path losses are monitored, load of the mobile station apparatus in monitoring the change of the path losses can be reduced, and timers can be managed in common in all the downlink component carriers, thus resulting in easy management of the timers.

A program that operates in the base station apparatus 3 and the mobile station apparatus 1 according to the present invention may be the program (program that makes a computer operate) that controls a CPU (Central Processing Unit) etc. so as to achieve a function in the above-mentioned embodiment according to the present invention. Additionally, information dealt with in these apparatuses is temporarily stored in RAM (Random Access Memory) at the time of processing thereof, subsequently stored in various ROMs, such as a Flash ROM (Read Only Memory), and a HDD (Hard Disk Drive), and the information is read, corrected/written by the CPU if needed.

Note that apart of the mobile station apparatus 1 and the base station apparatus 3 in the above-mentioned first to third embodiments may be achieved with a computer. In that case, the computer may be achieved by recording a program for achieving the above-described control function in a computer-readable recording medium, and making the program recorded in this recording medium read in a computer system to be executed. Note that a "computer system" referred to herein is defined to be the computer system incorporated in the mobile station apparatus 1 or the base station apparatus 3, and to include hardwares, such as an OS and a peripheral device.

In addition, a "computer-readable recording medium" means a portable medium, such as a flexible disk, a magnetic optical disk, a ROM, and a CD-ROM, and a memory storage incorporated in the computer system, such as a hard disk. Further, the "computer-readable recording medium" may also include a medium that dynamically holds a program for a short time as a communication wire used when the program is transmitted through a communication line, such as a network like the Internet, and a telephone line, and a medium that holds a program for a certain time as a volatile memory inside the computer system serving as a server or a client when the program is dynamically held for the short time. In addition, the above-described program may be the program for achieving a part of the above-mentioned function, and it may be the program in which the above-mentioned function can be achieved in combination with the program having been already recorded in the computer system.

In addition, some or all of the mobile station apparatus 1 and the base station apparatus 3 in the above-mentioned embodiment may be achieved as an LSI, which typically is an integrated circuit. Each functional block of the mobile station apparatus 1 and the base station apparatus 3 may be chipped individually, or some or all of them may be integrated to be chipped. In addition, a technique for making the functional blocks into an integrated circuit may be achieved not only as the LSI but as a dedicated circuit or a general-purpose processor. In addition, when a technology for making the functional blocks into the integrated circuit as an alternative to the LSI appears due to progress of a semiconductor technology, it is also possible to use an integrated circuit made by the technology.

As described above, although one embodiment of the present invention has been described in detail with reference to the drawings, a specific configuration is not limited to the above, and various changes of a design etc. can be made without departing from the scope of the present invention.

DESCRIPTION OF SYMBOLS 1 (1A, 1B, and 1C) MOBILE STATION APPARATUS
3 BASE STATION APPARATUS
101 HIGHER LAYER PROCESSING UNIT
103 CONTROL UNIT
105 RECEPTION UNIT
107 TRANSMISSION UNIT
201 HIGHER LAYER PROCESSING UNIT
203 CONTROL UNIT
205 RECEPTION UNIT
207 TRANSMISSION UNIT
209 PATH LOSS MEASUREMENT UNIT
1013 POWER HEADROOM SETTING UNIT
2015 POWER HEADROOM CONTROL UNIT

The invention claimed is:

1. A mobile station apparatus which communicates with a base station apparatus by using a plurality of uplink component carriers and a plurality of downlink component carriers, the mobile station apparatus comprising:

a reception unit configured to receive, from the base station apparatus, information indicating one or more downlink component carriers used for measurement of a path loss, and information indicating a correspondence between the downlink component carriers and the uplink component carrier;

a transmission power control unit configured to calculate a power headroom value for each of all the plurality of uplink component carriers;

a power headroom control unit configured to trigger a power headroom report in case that the path loss for at least one of the one or more downlink component carriers used for measurement of the path loss has changed more than a predetermined value;

the power headroom control unit is configured to instruct a transmission unit to transmit the power headroom value for each of all the plurality of uplink component carriers in case that at least one uplink radio resource for initial transmission is assigned to the mobile station apparatus and the power headroom report has been triggered and the power headroom control unit determines to transmit the power headroom value for each of all the plurality of uplink component carriers through the at least one uplink radio resource for initial transmission on the basis of a priority; and the transmission unit is configured to transmit the power headroom value for each of all the plurality of uplink component carriers through the at least one uplink radio resource for initial transmission; wherein in a case that the transmission unit transmits a physical uplink shared channel in a certain subframe for a certain uplink component carrier, the power headroom value for the certain uplink component carrier is calculated on the basis of a number of physical resource blocks assigned for a transmission of the physical uplink shared channel in the certain subframe for the certain uplink component carrier, and in a case that the transmission unit does not transmit the physical uplink shared channel in the certain subframe for the certain uplink component carrier, the power headroom value for the certain uplink component carrier is calculated by assuming that one physical resource block is assigned for the transmission of the physical uplink shared channel in the certain subframe for the certain uplink component carrier.

2. A base station apparatus which communicates with a mobile station apparatus by using a plurality of uplink component carriers and a plurality of downlink component carriers, the base station apparatus comprising:
- a transmission unit configured to transmit, to the mobile station apparatus, information indicating one or more downlink component carriers used for measurement of a path loss by the mobile station apparatus, and information indicating a correspondence between the downlink component carriers and the uplink component carrier;
- a reception unit configured to receive a power headroom value for each of all the plurality of uplink component carriers transmitted by the mobile station apparatus in case that at least one uplink radio resource for initial transmission is assigned to the mobile station apparatus and a power headroom report has been triggered and it is determined to transmit the power headroom value for each of all the plurality of uplink component carriers through the at least one uplink radio resource for initial transmission on the basis of a priority; and
- a radio resource control unit configured to determine how the power headroom value for each of all the plurality of uplink component carriers was calculated; wherein
- in a case that the reception unit receives a physical uplink shared channel in a certain subframe for a certain uplink component carrier, the power headroom value for the certain uplink component carrier is calculated on the basis of a number of physical resource blocks assigned for a transmission of the physical uplink shared channel in the certain subframe for the certain uplink component carrier, and
- in a case that the reception unit does not receive the physical uplink shared channel in the certain subframe for the certain uplink component carrier, the power headroom value for the certain uplink component carrier is calculated by assuming that one physical resource block is assigned for the transmission of the physical uplink shared channel in the certain subframe for the certain uplink component carrier,
- the power headroom report is triggered by the mobile station apparatus in case that the path loss for at least one of the one or more downlink component carriers used for measurement of the path loss has changed more than a predetermined value.

3. A radio communication method used for a mobile station apparatus which communicates with a base station apparatus by using a plurality of uplink component carriers and a plurality of downlink component carriers, the radio communication method comprising:
- receiving from the base station apparatus information indicating one or more downlink component carriers used for measurement of a path loss, and information indicating a correspondence between the downlink component carriers and the uplink component carrier;
- triggering a power headroom report in case that the path loss for at least one of the one or more downlink component carriers used for measurement of the path loss has changed more than a predetermined value; and
- calculating and transmitting a power headroom value for each of all the plurality of uplink component carriers in case that at least one uplink radio resource for initial transmission is assigned to the mobile station apparatus and the power headroom report has been triggered and it is determined to transmit the power headroom value for each of all the plurality of uplink component carriers through the at least one uplink radio resource for initial transmission on the basis of a priority; wherein
- in a case that a physical uplink shared channel is transmitted in a certain subframe for a certain uplink component carrier, calculating the power headroom value for the certain uplink component carrier on the basis of a number of physical resource blocks assigned for a transmission of the physical uplink shared channel in the certain subframe for the certain uplink component carrier, and
- in a case that the physical uplink shared channel is not transmitted in the certain subframe for the certain uplink component carrier, calculating the power headroom value for the certain uplink component carrier by assuming that one physical resource block is assigned for the transmission of the physical uplink shared channel in the certain subframe for the certain uplink component carrier.

4. A radio communication method used for a base station apparatus which communicates with a mobile station apparatus by using a plurality of uplink component carriers and a plurality of downlink component carriers, the radio communication method comprising:
- transmitting to the mobile station apparatus information indicating one or more downlink component carriers used for measurement of a path loss by the mobile station apparatus, and information indicating a correspondence between the downlink component carriers and the uplink component carrier;
- receiving a power headroom value for each of all the plurality of uplink component carriers transmitted by the mobile station apparatus in case that at least one uplink radio resource for initial transmission is assigned to the mobile station apparatus and a power headroom report has been triggered and it is determined to transmit the power headroom value for each of all the plurality of uplink component carriers through the at least one uplink radio resource for initial transmission on the basis of a priority; and
- determining how the power headroom value for each of all the plurality of uplink component carriers was calculated; wherein
- in a case that a physical uplink shared channel is transmitted in a certain subframe for a certain uplink component carrier, the power headroom value for the certain uplink component carrier is calculated on the basis of a number of physical resource blocks assigned for a transmission of the physical uplink shared channel in the certain subframe for the certain uplink component carrier,
- in a case that the physical uplink shared channel is not transmitted in the certain subframe for the certain uplink component carrier, the power headroom value for the certain uplink component carrier is calculated by assuming that one physical resource block is assigned for the transmission of the physical uplink shared channel in the certain subframe for the certain uplink component carrier, and
- the power headroom report is triggered by the mobile station apparatus in case that the path loss for at least one of the one or more downlink component carriers used for measurement of the path loss has changed more than a predetermined value.

5. An integrated circuit causing a mobile station apparatus to exhibit a plurality of functions by being mounted in the mobile station apparatus which communicates with a base station apparatus by using a plurality of uplink component carriers and a plurality of downlink component carriers, the integrated circuit causing the mobile station apparatus to exhibit the functions of:
- receiving from the base station apparatus information indicating one or more downlink component carriers used for measurement of a path loss, and information indicating a correspondence between the downlink component carriers and the uplink component carrier;
- triggering a power headroom report in case that the path loss for at least one of the one or more downlink component carriers used for measurement of the path loss has changed more than a predetermined value; and
- calculating and transmitting a power headroom value for each of all the plurality of uplink component carriers in case that at least one uplink radio resource for initial transmission is assigned to the mobile station apparatus and the power headroom report has been triggered and it is determined to transmit the power headroom value for each of all the plurality of uplink component carriers through the at least one uplink radio resource for initial transmission on the basis of a priority; wherein
- in a case that a physical uplink shared channel is transmitted in a certain subframe for a certain uplink component carrier, calculating the power headroom value for the certain uplink component carrier on the basis of a number of physical resource blocks assigned for a transmission of the physical uplink shared channel in the certain subframe for the certain uplink component carrier, and
- in a case that the physical uplink shared channel is not transmitted in the certain subframe for the certain uplink component carrier, calculating the power headroom value for the certain uplink component carrier by assuming that one physical resource block is assigned for the transmission of the physical uplink shared channel in the certain subframe for the certain uplink component carrier.

6. An integrated circuit causing a base station apparatus to exhibit a plurality of functions by being implemented in the base station apparatus which communicates with a mobile station apparatus by using a plurality of uplink component carriers and a plurality of downlink component carriers, the integrated circuit causing the base station apparatus to exhibit the functions of:
- transmitting to the mobile station apparatus information indicating one or more downlink component carriers used for measurement of a path loss by the mobile station apparatus, and information indicating a correspondence between the downlink component carriers and the uplink component carrier;
- receiving a power headroom value for each of all the plurality of uplink component carriers transmitted by the mobile station apparatus in case that at least one uplink radio resource for initial transmission is assigned to the mobile station apparatus and a power headroom report has been triggered and it is determined to transmit the power headroom value for each of all the plurality of uplink component carriers through the at least one uplink radio resource for initial transmission on the basis of a priority; and
- determining how the power headroom value for each of all the plurality of uplink component carriers was calculated; wherein
- in a case that a physical uplink shared channel is transmitted in a certain subframe for a certain uplink component carrier, the power headroom value for the certain uplink component carrier is calculated on the basis of a number of physical resource blocks assigned for a transmission of the physical uplink shared channel in the certain subframe for the certain uplink component carrier, and
- in a case that the physical uplink shared channel is not transmitted in the certain subframe for the certain uplink component carrier, the power headroom value for the certain uplink component carrier is calculated by assuming that one physical resource block is assigned for the transmission of the physical uplink shared channel in the certain subframe for the certain uplink component carrier, and
- the power headroom report is triggered by the mobile station apparatus in case that the path loss for at least one of the one or more downlink component carriers used for measurement of the path loss has changed more than a predetermined value.

7. A mobile station apparatus which communicates with a base station apparatus by using a plurality of uplink component carriers and a plurality of downlink component carriers, the mobile station apparatus comprising:
- a reception unit configured to receive, from the base station apparatus, information indicating one or more downlink component carriers used for measurement of a path loss, and information indicating a correspondence between the downlink component carriers and the uplink component carrier;
- a transmission unit configured to transmit a power headroom value for each of all the plurality of uplink component carriers and a second power headroom value for a certain uplink component carrier through at least one uplink radio resource for initial transmission;
- a power headroom control unit configured to trigger a power headroom report in case that the path loss for at least one of the one or more downlink component carriers used for measurement of the path loss has changed more than a predetermined value; and
- the power headroom control unit is configured to instruct a transmission unit to transmit the power headroom value for each of all the plurality of uplink component carriers and the second power headroom value for the certain uplink component carrier in case that the at least one uplink radio resource for initial transmission is assigned to the mobile station apparatus and the power headroom report has been triggered and the power headroom control unit determines to transmit the power headroom value for each of all the plurality of uplink component carriers and the second power headroom value for the certain uplink component carrier through the at least one uplink radio resource for initial transmission on the basis of a priority; wherein
- in a case that the transmission unit transmits a physical uplink control channel in a certain subframe for the certain uplink component carrier, the second power headroom value for the certain uplink component carrier is calculated on the basis of a physical uplink control channel format for a transmission of the physical uplink control channel in the certain subframe for the certain uplink component carrier,
- in a case that the transmission unit does not transmit the physical uplink control channel in the certain subframe for the certain uplink component carrier, the second power headroom value for the certain uplink component carrier is calculated by assuming that physical uplink control channel format 1$a$ is assigned for the transmission of the physical uplink control channel in the certain subframe for the certain uplink component carrier, and the certain uplink component carrier of the plurality of uplink component carriers is available to transmit the physical uplink control channel.

8. A radio communication method used for a mobile station apparatus which communicates with a base station apparatus by using a plurality of uplink component carriers and a plurality of downlink component carriers, the radio communication method comprising:

receiving from the base station apparatus information indicating one or more downlink component carriers used for measurement of a path loss, and information indicating a correspondence between the downlink component carriers and the uplink component carrier;

triggering a power headroom report in case that the path loss for at least one of the one or more downlink component carriers used for measurement of the path loss has changed more than a predetermined value;

calculating and transmitting a power headroom value for each of all the plurality of uplink component carriers and a second power headroom value for a certain uplink component carrier in case that at least one uplink radio resource for initial transmission is assigned to the mobile station apparatus and the power headroom report has been triggered and it is determined to transmit the power headroom value for each of all the plurality of uplink component carriers and the second power headroom value for the certain uplink component carrier through the at least one uplink radio resource for initial transmission on the basis of a priority; wherein in a case that the physical uplink control channel is transmitted in a certain subframe for the certain uplink component carrier, calculating the second power headroom value for the certain uplink component carrier on the basis of a physical uplink control channel format for a transmission of the physical uplink control channel in the certain subframe for the certain uplink component carrier, in a case that the physical uplink control channel is not transmitted in the certain subframe for the certain uplink component carrier, calculating the second power headroom value for the certain uplink component carrier by assuming that a physical uplink control channel format 1$a$ is assigned for the transmission of the physical uplink control channel in the certain subframe for the certain uplink component carrier, and the certain uplink component carrier of the plurality of uplink component carriers is available to transmit the physical uplink control channel.

9. A base station apparatus which communicates with a mobile station apparatus by using a plurality of uplink component carriers and a plurality of downlink component carriers, the base station apparatus comprising:

a transmission unit configured to transmit, to the mobile station apparatus, information indicating one or more downlink component carriers used for measurement of a path loss by the mobile station apparatus, and information indicating a correspondence between the downlink component carriers and the uplink component carrier;

a reception unit configured to receive a power headroom value for each of all the plurality of uplink component carriers and a second power headroom value for a certain uplink component carrier transmitted by the mobile station apparatus in case that at least one uplink radio resource for initial transmission is assigned to the mobile station apparatus and a power headroom report has been triggered and it is determined to transmit the power headroom value for each of all the plurality of uplink component carriers and the second power headroom value for the certain uplink component carrier through the at least one uplink radio resource for initial transmission on the basis of a priority; and a radio resource control unit configured to determine how the second power headroom value for the certain uplink component carrier was calculated; wherein in a case that the reception unit receives a physical uplink control channel in a certain subframe for the certain uplink component carrier, the second power headroom value for the certain uplink component carrier is calculated on the basis of a physical uplink control channel format for a transmission of the physical uplink control channel in the certain subframe for the certain uplink component carrier, in a case that the reception unit does not receive the physical uplink control channel in the certain subframe for the certain uplink component carrier, the second power headroom value for the certain uplink component carrier is calculated by assuming that physical uplink control channel format 1$a$ is assigned for the transmission of the physical uplink control channel in the certain subframe for the certain uplink component carrier, the certain uplink component carrier of the plurality of uplink component carriers is available to transmit the physical uplink control channel, and the power headroom report is triggered by the mobile station apparatus in case that the path loss for at least one of the one or more downlink component carriers used for measurement of the path loss has changed more than a predetermined value.

10. A radio communication method used for a base station apparatus which communicates with a mobile station apparatus by using a plurality of uplink component carriers and a plurality of downlink component carriers, the radio communication method comprising:

transmitting to the mobile station apparatus information indicating one or more downlink component carriers used for measurement of a path loss by the mobile station apparatus, and information indicating a correspondence between the downlink component carriers and the uplink component carrier;

receiving a power headroom value for each of all the plurality of uplink component carriers and a second power headroom value for a certain uplink component carrier transmitted by the mobile station apparatus in case that at least one uplink radio resource for initial transmission is assigned to the mobile station apparatus and a power headroom report has been triggered and it is determined to transmit the power headroom value for each of all the plurality of uplink component carriers and the second power headroom value for the certain uplink component carrier through the at least one uplink radio resource for initial transmission on the basis of a priority; and determining how the second power headroom value for the certain uplink component carrier was calculated; wherein in a case that the physical uplink control channel is transmitted in a certain subframe for the certain uplink component carrier, the second power headroom value for the certain uplink component carrier is calculated on the basis of a physical uplink control channel format for a transmission of the physical uplink control channel in the certain subframe for the certain uplink component carrier, in a case that the physical uplink control channel is not transmitted in the certain subframe for the certain uplink component carrier, the second power headroom value for the certain uplink component carrier is calculated by assuming that a physical uplink control channel format 1a is assigned for the transmission of the physical uplink control channel in the certain subframe for the certain uplink component carrier, the power headroom report is triggered by the mobile station apparatus in case that the path loss for at least one of the one or more downlink component carriers used for measurement of the path loss has changed more than a predetermined value, and the certain uplink component carrier of the plurality of uplink component carriers is available to transmit the physical uplink control channel.

11. An integrated circuit causing a mobile station apparatus to exhibit a plurality of functions by being mounted in the mobile station apparatus which communicates with a base station apparatus by using a plurality of uplink component carriers and a plurality of downlink component carriers, the integrated circuit causing the mobile station apparatus to exhibit the functions of:

receiving from the base station apparatus information indicating one or more downlink component carriers used for measurement of a path loss, and information indicating a correspondence between the downlink component carriers and the uplink component carrier;

triggering a power headroom report in case that the path loss for at least one of the one or more downlink component carriers used for measurement of the path loss has changed more than a predetermined value;

calculating and transmitting a power headroom value for each of all the plurality of uplink component carriers and a second power headroom value for a certain uplink component carrier in case that at least one uplink radio resource for initial transmission is assigned to the mobile station apparatus and the power headroom report has been triggered and it is determined to transmit the power headroom value for each of all the plurality of uplink component carriers and the second power headroom value for the certain uplink component carrier through the at least one uplink radio resource for initial transmission on the basis of a priority; wherein in a case that the physical uplink control channel is transmitted in a certain subframe for the certain uplink component carrier, calculating the second power headroom value for the certain uplink component carrier on the basis of a physical uplink control channel format for a transmission of the physical uplink control channel in the certain subframe for the certain uplink component carrier, in a case that the physical uplink control channel is not transmitted in the certain subframe for the certain uplink component carrier, calculating the second power headroom value for the certain uplink component carrier by assuming that a physical uplink control channel format 1a is assigned for the transmission of the physical uplink control channel in the certain subframe for the certain uplink component carrier, and the certain uplink component carrier of the plurality of uplink component carriers is available to transmit the physical uplink control channel.

12. An integrated circuit causing a base station apparatus to exhibit a plurality of functions by being implemented in the base station apparatus which communicates with a mobile station apparatus by using a plurality of uplink component carriers and a plurality of downlink component carriers, the integrated circuit causing the base station apparatus to exhibit the functions of:

transmitting to the mobile station apparatus information indicating one or more downlink component carriers used for measurement of a path loss by the mobile station apparatus, and information indicating a correspondence between the downlink component carriers and the uplink component carrier;

receiving a power headroom value for each of all the plurality of uplink component carriers and a second power headroom value for a certain uplink component carrier transmitted by the mobile station apparatus in case that at least one uplink radio resource for initial transmission is assigned to the mobile station apparatus and a power headroom report has been triggered and it is determined to transmit the power headroom value for each of all the plurality of uplink component carriers and the second power headroom value for the certain uplink component carrier through the at least one uplink radio resource for initial transmission on the basis of a priority;

determining how the second power headroom value for the certain uplink component carrier was calculated; wherein in a case that the physical uplink control channel is transmitted in a certain subframe for the certain uplink component carrier, calculating the second power headroom value for the certain uplink component carrier on the basis of a physical uplink control channel format for a transmission of the physical uplink control channel in the certain subframe for the certain uplink component carrier, in a case that the physical uplink control channel is not transmitted in the certain subframe for the certain uplink component carrier, calculating the second power headroom value for the certain uplink component carrier by assuming that a physical uplink control channel format 1a is assigned for the transmission of the physical uplink control channel in the certain subframe for the certain uplink component carrier, the power headroom report is triggered by the mobile station apparatus in case that the path loss for at least one of the one or more downlink component carriers used for measurement of the path loss has changed more than a predetermined value, and the certain uplink component carrier of the plurality of uplink component carriers is available to transmit the physical uplink control channel.

* * * * *